United States Patent
Han et al.

(10) Patent No.: US 11,520,640 B2
(45) Date of Patent: Dec. 6, 2022

(54) EFFICIENT AND MORE ADVANCED IMPLEMENTATION OF RING-ALLREDUCE ALGORITHM FOR DISTRIBUTED PARALLEL DEEP LEARNING

(71) Applicant: ALIBABA GROUP HOLDING LIMITED, Grand Cayman (KY)

(72) Inventors: Liang Han, San Mateo, CA (US); Yang Jiao, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 498 days.

(21) Appl. No.: 16/777,711

(22) Filed: Jan. 30, 2020

(65) Prior Publication Data

US 2021/0240543 A1    Aug. 5, 2021

(51) Int. Cl.
*G06F 9/52* (2006.01)
*G06F 9/48* (2006.01)
*G06N 20/00* (2019.01)

(52) U.S. Cl.
CPC .............. *G06F 9/52* (2013.01); *G06F 9/4881* (2013.01); *G06N 20/00* (2019.01)

(58) Field of Classification Search
CPC .................................... G06F 9/52; G06F 9/48
See application file for complete search history.

(56) References Cited

U.S. PATENT DOCUMENTS

| | | | | |
|---|---|---|---|---|
| 9,652,520 | B2* | 5/2017 | Oliver | H04L 67/5682 |
| 11,080,228 | B2* | 8/2021 | Fong | G06N 20/00 |
| 2013/0073814 | A1* | 3/2013 | Wang | G06F 15/17362 |
| | | | | 711/E12.001 |
| 2013/0212561 | A1* | 8/2013 | Archer | G06F 8/34 |
| | | | | 717/109 |

(Continued)

OTHER PUBLICATIONS

Sergeev et al., "Meet Horovod: Uber's Open Source Distributed Deep Learning Framework for TensorFlow," https://eng.uber.com/horovod/, Oct. 17, 2017, 16 pages.

*Primary Examiner* — Phil K Nguyen
(74) *Attorney, Agent, or Firm* — Finnegan, Henderson, Farabow, Garrett & Dunner LLP

(57) ABSTRACT

The present disclosure provides a method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, a computing node B of the first group with a computing node B of the second group, a computing node C of the first group with the computing node C of the second group, and a computing node D of the first group with a computing node D of the second group, the method comprising: syncing across a first dimension of computing nodes using a first set of ring connections, (Continued)

wherein the first set of ring connections are formed using inter-group and intra-group interconnects that communicatively couple the computing nodes along the first dimension; and broadcasting synced data across a second dimension of computing nodes using a second ring connection.

24 Claims, 15 Drawing Sheets

(56) References Cited

U.S. PATENT DOCUMENTS

2015/0052532 A1\* 2/2015 Iwata ................... G06F 9/505
            718/102
2015/0347549 A1\* 12/2015 Chang ............... G06F 16/24556
            707/610

\* cited by examiner

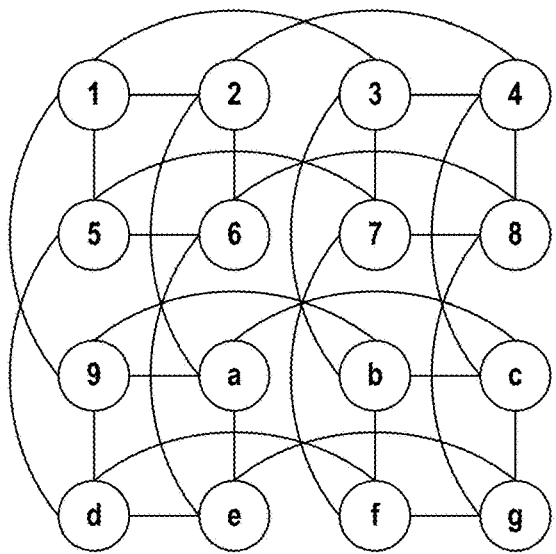

| Node 1:<br>A.1 | Node 2:<br>B.2 | Node 3:<br>C.3 | Node 4:<br>D.4 |
|---|---|---|---|
| Node 5:<br>A.5 | Node 6:<br>B.6 | Node 7:<br>C.7 | Node 8:<br>D.8 |
| Node 9:<br>A.9 | Node a:<br>B.a | Node b:<br>C.b | Node c:<br>D.c |
| Node d:<br>A.d | Node e:<br>B.e | Node f:<br>C.f | Node g:<br>D.g |

Stage 1310

| Node 1:<br>B.1234 | Node 2:<br>C.1234 | Node 3:<br>D.1234 | Node 4:<br>A.1234 |
|---|---|---|---|
| Node 5:<br>B.5678 | Node 6:<br>C.5678 | Node 7:<br>D.5678 | Node 8:<br>A.5678 |
| Node 9:<br>B.9abc | Node a:<br>C.9abc | Node b:<br>D.9abc | Node c:<br>A.9abc |
| Node d:<br>B.defg | Node e:<br>C.defg | Node f:<br>D.defg | Node g:<br>A.defg |

Stage 1320

| Node 1:<br>B.all | Node 2:<br>C.all | Node 3:<br>D.all | Node 4:<br>A.all |
|---|---|---|---|
| Node 5:<br>B.all | Node 6:<br>C.all | Node 7:<br>D.all | Node 8:<br>A.all |
| Node 9:<br>B.all | Node a:<br>C.all | Node b:<br>D.all | Node c:<br>A.all |
| Node d:<br>B.all | Node e:<br>C.all | Node f:<br>D.all | Node g:<br>A.all |

Stage 1330

| Node 1:<br>A/B/C/D.all | Node 2:<br>A/B/C/D.all | Node 3:<br>A/B/C/D.all | Node 4:<br>A/B/C/D.all |
|---|---|---|---|
| Node 5:<br>A/B/C/D.all | Node 6:<br>A/B/C/D.all | Node 7:<br>A/B/C/D.all | Node 8:<br>A/B/C/D.all |
| Node 9:<br>A/B/C/D.all | Node a:<br>A/B/C/D.all | Node b:<br>A/B/C/D.all | Node c:<br>A/B/C/D.all |
| Node d:<br>A/B/C/D.all | Node e:<br>A/B/C/D.all | Node f:<br>A/B/C/D.all | Node g:<br>A/B/C/D.all |

Stage 1340

FIG. 13

EFFICIENT AND MORE ADVANCED IMPLEMENTATION OF RING-ALLREDUCE ALGORITHM FOR DISTRIBUTED PARALLEL DEEP LEARNING

BACKGROUND

Current methodologies for distributed training of neural networks involve applying synchronized large minibatch stochastic gradient descent ("SDG") method on many distributed computing nodes to explore data parallel based acceleration. The inter-computing-node communication mode in such methodologies is the "AllReduce" algorithm. The conventional hardware interconnect for implementing the AllReduce algorithm is based on torus topologies, which suffers from many significant issues, including delays in long wirings and an inability to divide up computing nodes to assign multiple computing tasks.

SUMMARY

Embodiments of the present disclosure provides a system for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, a computing node B of the first group with a computing node B of the second group, a computing node C of the first group with the computing node C of the second group, and a computing node D of the first group with a computing node D of the second group, the method comprising: syncing across a first dimension of computing nodes using a first ring connection, wherein the first ring connection is formed using inter-group and intra-group interconnects that communicatively couple the computing nodes along the first dimension; and broadcasting synced data across a second dimension of computing nodes using a second ring connection, wherein the second ring connection is formed using inter-group and intra-group interconnects that communicatively couple the computing nodes along the second dimension.

Embodiments of the present disclosure also provide a method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, a computing node B of the first group with a computing node B of the second group, a computing node C of the first group with the computing node C of the second group, and a computing node D of the first group with a computing node D of the second group, the system comprising: a memory storing a set of instructions; and one or more processors configured to executed the set of instructions to cause the system to: sync data across a first dimension of computing nodes using a ring connection, wherein the ring connection is formed using inter-group and intra-group interconnects that communicatively couple the computing nodes along the first dimension; and broadcast synced data across a second dimension of computing nodes using a second ring connection, wherein the second ring connection is formed using inter-group and intra-group interconnects that communicatively couple the computing nodes along the second dimension.

Embodiments of the present disclosure further provide non-transitory computer readable media that store a set of instructions that are executable by one or more processors of an apparatus to initiate a method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, a computing node B of the first group with a computing node B of the second group, a computing node C of the first group with the computing node C of the second group, and a computing node D of the first group with a computing node D of the second group, the method comprising: syncing data across a first dimension of computing nodes using a ring connection, wherein the ring connection is formed using inter-group and intra-group interconnects that communicatively couple the computing nodes along the first dimension; and broadcasting synced data across a second dimension of computing nodes using a second ring connection, wherein the second ring connection is formed using inter-group and intra-group interconnects that communicatively couple the computing nodes along the second dimension.

BRIEF DESCRIPTION OF THE DRAWINGS

The accompanying drawings, which are incorporated in and constitute a part of this specification, illustrate embodiments consistent with the invention and, together with the description, explain the principles of the invention.

FIG. 13 illustrates an exemplary implementation of a two-dimensional routing for executing an AllReduce algorithm on a hyper-square interconnect topology, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Distributed computing is a field of computer science that studies distributed systems. A distributed system is a system in which components are located on different networked computers, which communicate and coordinate their actions by passing messages to one another.

Distributed deep learning is an implementation of deep learning algorithms. Since deep learning algorithms can require a lot of computing power, distributing such algorithm workload to multiple computers or chips to accelerate the computation in a parallel fashion becomes necessary for large computing tasks, especially in the training phase of the deep learning algorithm.

Current methodologies for distributed training of neural networks involve applying SDG method on many distributed computing nodes to explore data parallel based acceleration. The inter-computing-node communication mode in such methodologies is the "AllReduce" algorithm. The AllReduce operation is one of the dominant modes for inter-computing-node communication in such methodologies. In an AllReduce operation, all versions of values for a same variable are first gathered, or reduced, from all distributed nodes. An average value is then calculated and broadcasted to all distributed nodes. In other words, the AllReduce operation is a two-phase communication that involves a reduce step and a broadcast step. The AllReduce operation can be applied to a number of variables simultaneously.

Although the reduce step can be perform by adding different versions of a value before taking an average, the reduce step may also include other operations, such as a multiplying operation, an "OR" operation, a "NOR" operation, etc. It is appreciated that all operations generally satisfies associativity and commutativity. For example, the reduce step can be performed on some versions of a value first before other reduce steps are performed on the other versions. The end result can be the same as if a single reduce step was performed on all versions at once.

Figure 1:
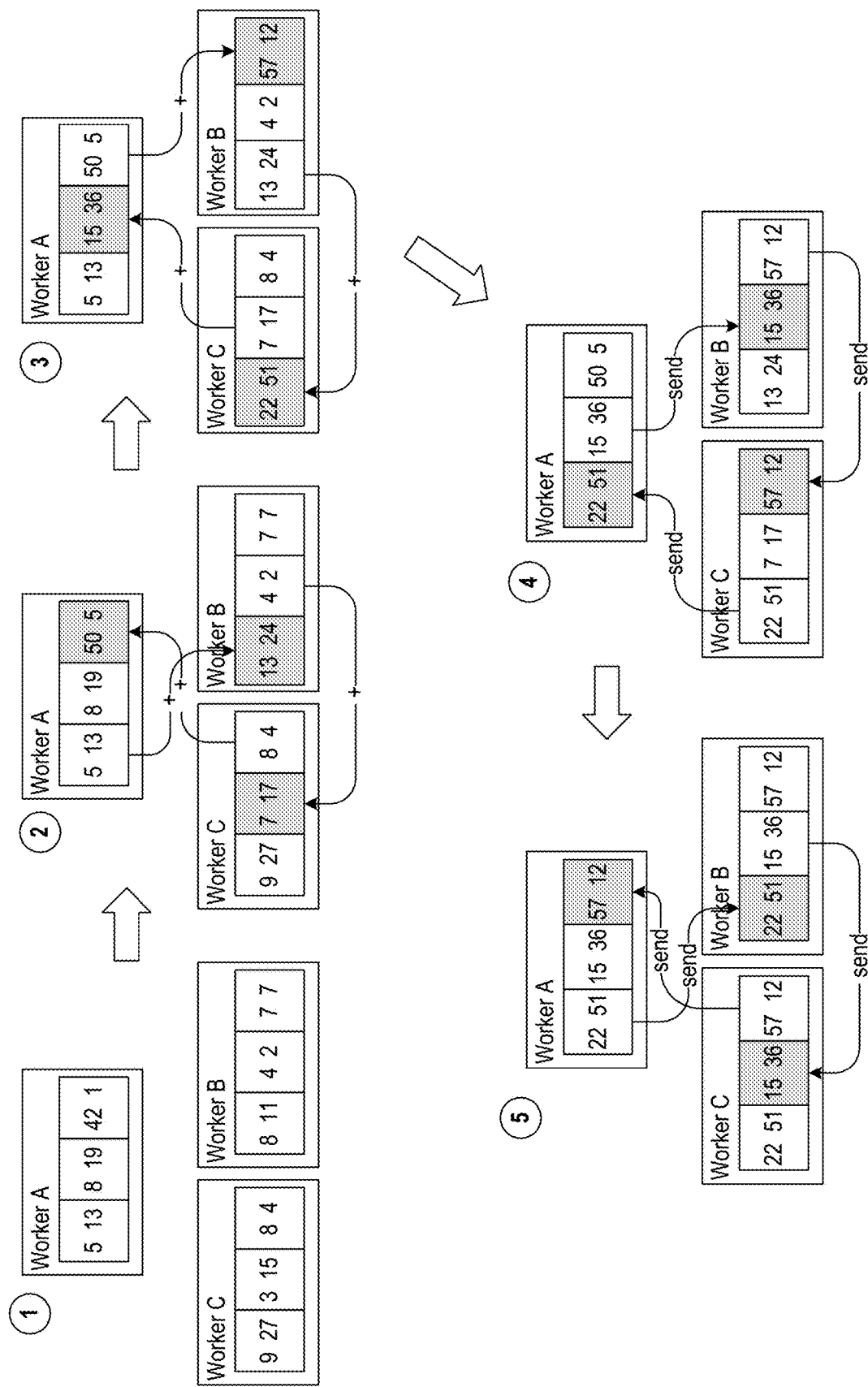
FIG. 1 illustrates an exemplary implementation of a ring-based AllReduce operation.

There are many ways to implement the AllReduce operation. Although a straightforward topology implementation of AllReduce is tree-based, AllReduce operations based on ring structures is a dominating solution in the industry due to its higher bandwidth utilization rate and efficiency. FIG. 1 illustrates an exemplary implementation of a ring-based AllReduce operation.

According to FIG. 1, there are three computing nodes named Worker A, Worker B, and Worker C, and each computing node comprises three sets of variables. For example, initially, Worker A comprises three variables with values (5, 13), (8, 19), and (42, 1). In an AllReduce operation, variables across all computing nodes are summed up first, and then an average of each variable is calculated and broadcasted to each computing node. For example, the AllReduce operation can be broken down into five steps shown in FIG. 1. In step 1, all variables are ready for the AllReduce operation to initiate. In step 2, values of the first variables in Worker A and Worker B are summed up and stored into Worker B, values of the second variables in Worker B and Worker C are summed up and stored into Worker C, and values of the third variables in Worker C and Worker A are summed up and stored into Worker A. In step 3, values of the third variables in Worker A and Worker B are summed up and stored in Worker B, values of the first variables in Worker B and Worker C are summed up and stored into Worker C, and values of the second variables in Worker C and Worker A are summed up and stored into Worker A.

At this stage, values of all variables have been summed up and stored in Worker A, Worker B, or Worker C. The next stage is to broadcast these summed-up values from its computing node into the other computing nodes. In step 4, value of the second variable from Worker A is sent to Worker B to replace Worker B's second variable, value of the third variable from Worker B is sent to Worker C to replace Worker C's third variable, and value of the first variable from Worker C is sent to Worker A to replace Worker A's first variable. In step 5, value of the first variable from Worker A is sent to Worker B to replace Worker B's first variable, value of the second variable from Worker B is sent to Worker C to replace Worker C's second variable, and value of the third variable from Worker C is sent to Worker A to replace Worker A's third variable.

Figure 2:
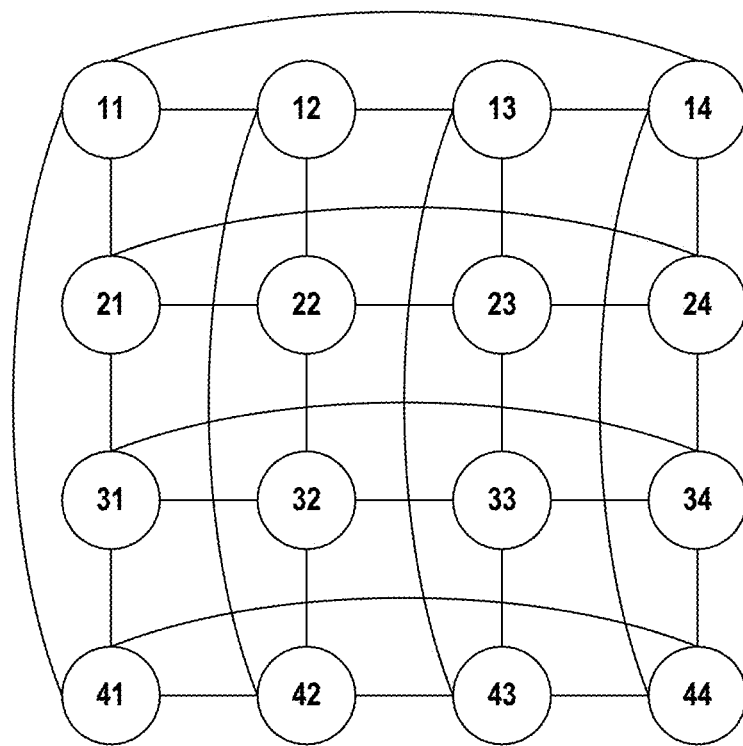
FIG. 2 illustrates an exemplary 4×4 two-dimensional torus interconnection.

To effectively implement AllReduce operations across multiple chips or processors using hardware, many kinds of hardware interconnect topology can be utilized. For example, a two-dimensional ("2D") torus network, a three-dimensional torus network, or a hypercube network can be utilized as solutions of hardware interconnect topology for implementing AllReduce operations. FIG. 2 illustrates an exemplary 4×4 two-dimensional torus interconnection. According to the 2D torus interconnection shown in FIG. 2, each row or column of computing nodes (e.g., chips) forms a ring. For example, the first row comprises computing node 11, computing node 12, computing node 13, and computing node 14. A ring is formed as 11-12-13-14-11. Since each row or column can form a ring, the AllReduce operation described in FIG. 1 can be implemented in 2D torus interconnection shown in FIG. 2.

One of the significant issues surrounding conventional interconnect topologies like the torus topology of FIG. 2 is that the torus topology does not scale up effectively. In many implementations, it is likely that multiple computing tasks run simultaneously on the interconnect. As a result, the interconnect may need to be divided up into multiple sections, with each section handling a specific computing task. For example, computing nodes 11, 12, and 13 can be assigned to one computing task, while computing node 14 can be assigned to another computing task. The issue is that computing nodes 11, 12, and 13 no longer have a ring connection among them. To form a ring, data from computing node 13 needs to hop to computing node 11 via computing node 12. The hopping makes communication inefficient and blocks traffic of other potential communications surrounding computing node 12.

Another significant issue surrounding the conventional interconnect topologies is that the torus topology needs long wires to connect computing nodes at the ends of each ring. For example, the wire connecting computing node 11 and computing node 14 is longer than the wires connecting computing node 11 and computing node 12. When the hardware system scales up, the number of computing nodes in a ring increases, causing computing nodes to be further away from each other. As a result, longer wiring is needed to connect computing nodes at the ends of the ring, which can start causing significant delays in communication. For example, a 56-Gbps transfer rate can be sustained within 1 meter of copper cable. If the length of the copper cable increases, the transfer rate that can be sustained would be less than 56 Gbps. At the same time, to sustain a higher transfer rate, such as a 112-Gbps transfer rate, the length of the copper cable needs to be significantly shorter than 1 meter.

Figure 3A:
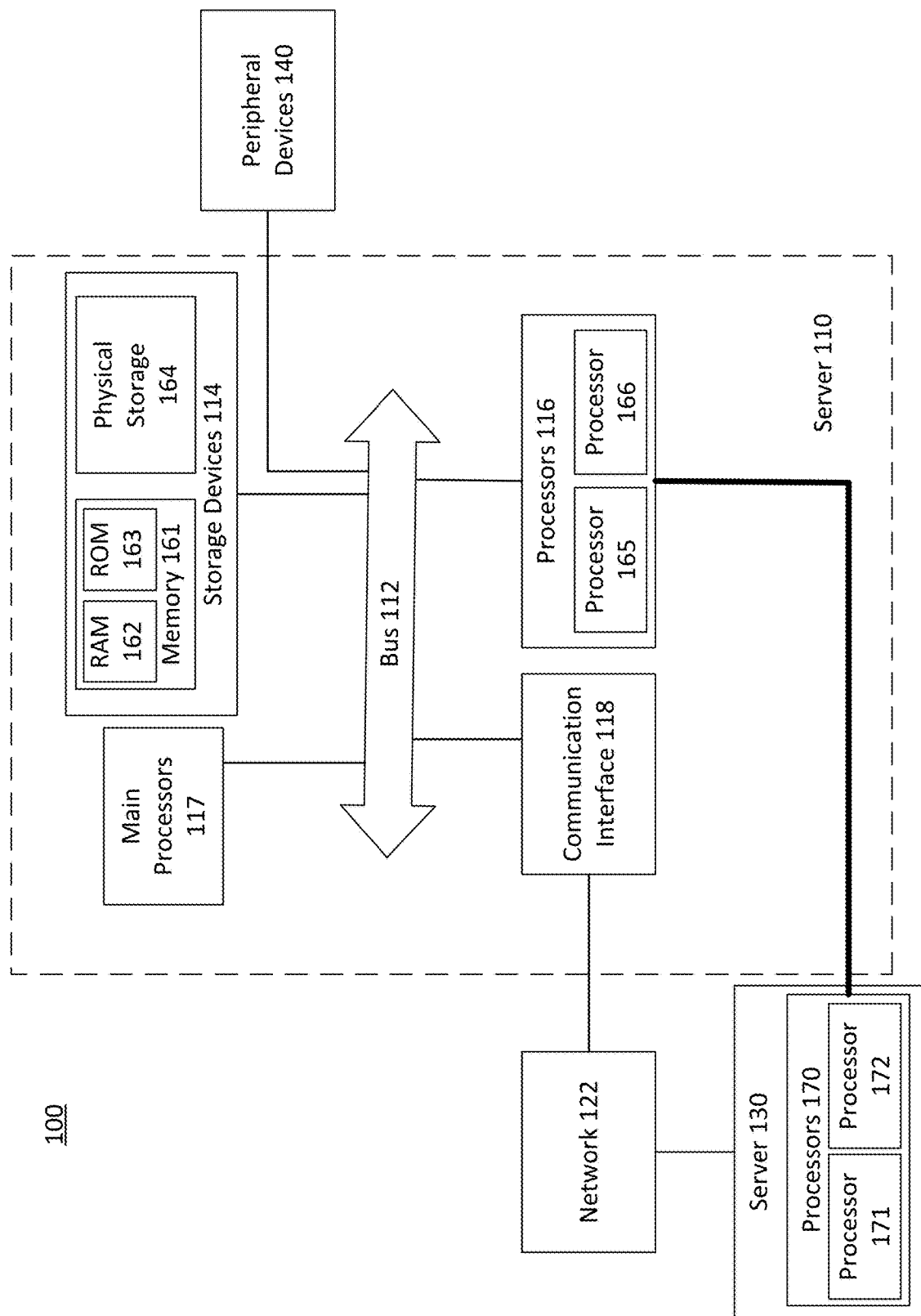
FIG. 3A illustrates a schematic diagram of an exemplary server of a distributed system, according to some embodiments of the present disclosure.

To resolve these issues, embodiments of the present disclosure present a hyper-square interconnect topology and advanced ring-based AllReduce operations. FIG. 3A illustrates a schematic diagram of an exemplary server of a distributed system, according to some embodiments of the present disclosure. According to FIG. 3A, server 110 of distributed system 100 comprises a bus 112 or other communication mechanism for communicating information, one or more processors 116 communicatively coupled with bus 112 for processing information, and one or more main processors 117 communicatively coupled with bus 112 for processing information. Processors 116 can be, for example, one or more microprocessors. In some embodiments, one or more processors 116 comprises processor 165 and processor 166, and processor 165 and processor 166 are connected via an inter-chip interconnect of an interconnect topology. Main processors 117 can be, for example, central processing units ("CPUs").

Server 110 can transmit data to or communicate with another server 130 through a network 122. Network 122 can be a local network, an internet service provider, internet, or any combination thereof. Communication interface 118 of server 110 is connected to network 122. Moreover, one or more processors 116 of server 110 can be connected to one or more processors 170 of server 130 via inter-chip interconnects of the interconnect topology (shown in bold). In some embodiments, one or more processors 170 of server 130 comprises processor 171 and 172, and processor 165, processor 166, processor 171, and processor 172 are connected via inter-chip interconnects of the interconnect topology. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 and main processors 117 via bus 112. Storage devices 114 may include a main memory, which can be used for storing temporary variables or other intermediate information during execution of instructions to be executed by processors 116 and main processors 117. Such instructions, after being stored in non-transitory storage media accessible to processors 116 and main processors 117, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 or main processors 117 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 or main processors 117 retrieves and executes the instructions.

Figure 3B:
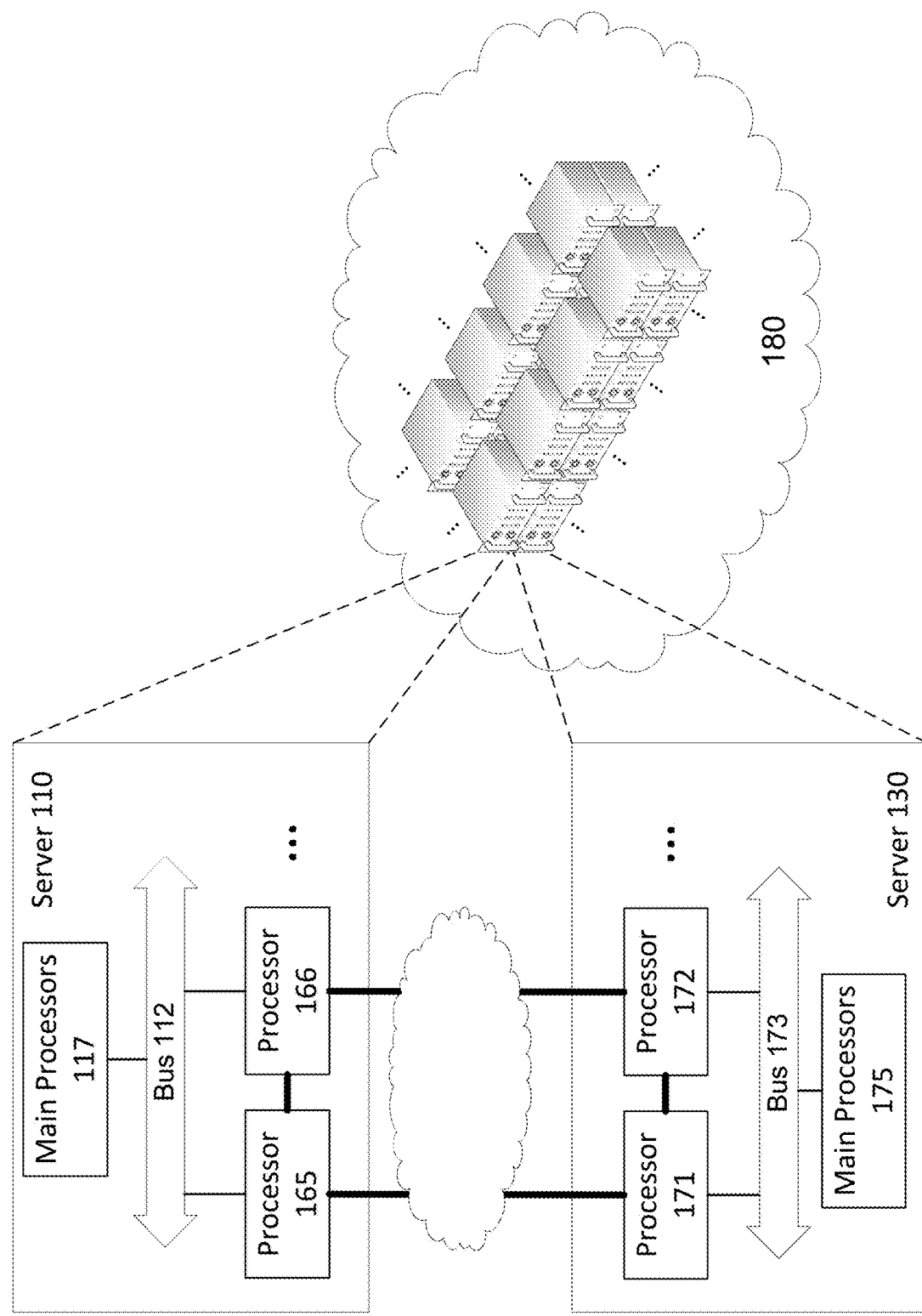
FIG. 3B illustrates a schematic diagram of an exemplary computing cluster comprising servers, according to some embodiments of the present disclosure.

In some embodiments, servers (e.g., server 110 of FIG. 3A) can be arranged together to form a computing cluster. FIG. 3B illustrates a schematic diagram of an exemplary computing cluster comprising servers, according to some embodiments of the present disclosure. As shown in FIG. 3B, computing cluster 180 comprises many servers, including servers 110 and 130. The servers can be arranged so that each server can have neighbors in any directions, such as up, down, left, right, front, and behind. Although servers can communicate with each other via buses (e.g., bus 112 of server 110 and bus 173 of server 130) and communication interfaces (e.g., communication interface 118 shown in FIG. 3A), processors inside the servers can also communicate with each other via inter-chip interconnects of an interconnect topology. For example, as shown in FIG. 3B, processors 165 and 166 of server 110 can be connected with processors 171 and 172 of server 130 via inter-chip interconnects of the interconnect topology (shown in bold). Processors 165 and 166 of server 110 and processors 171 and 172 of server 130 can also be connected with each other via inter-chip interconnects of the interconnect topology.

Figure 4:
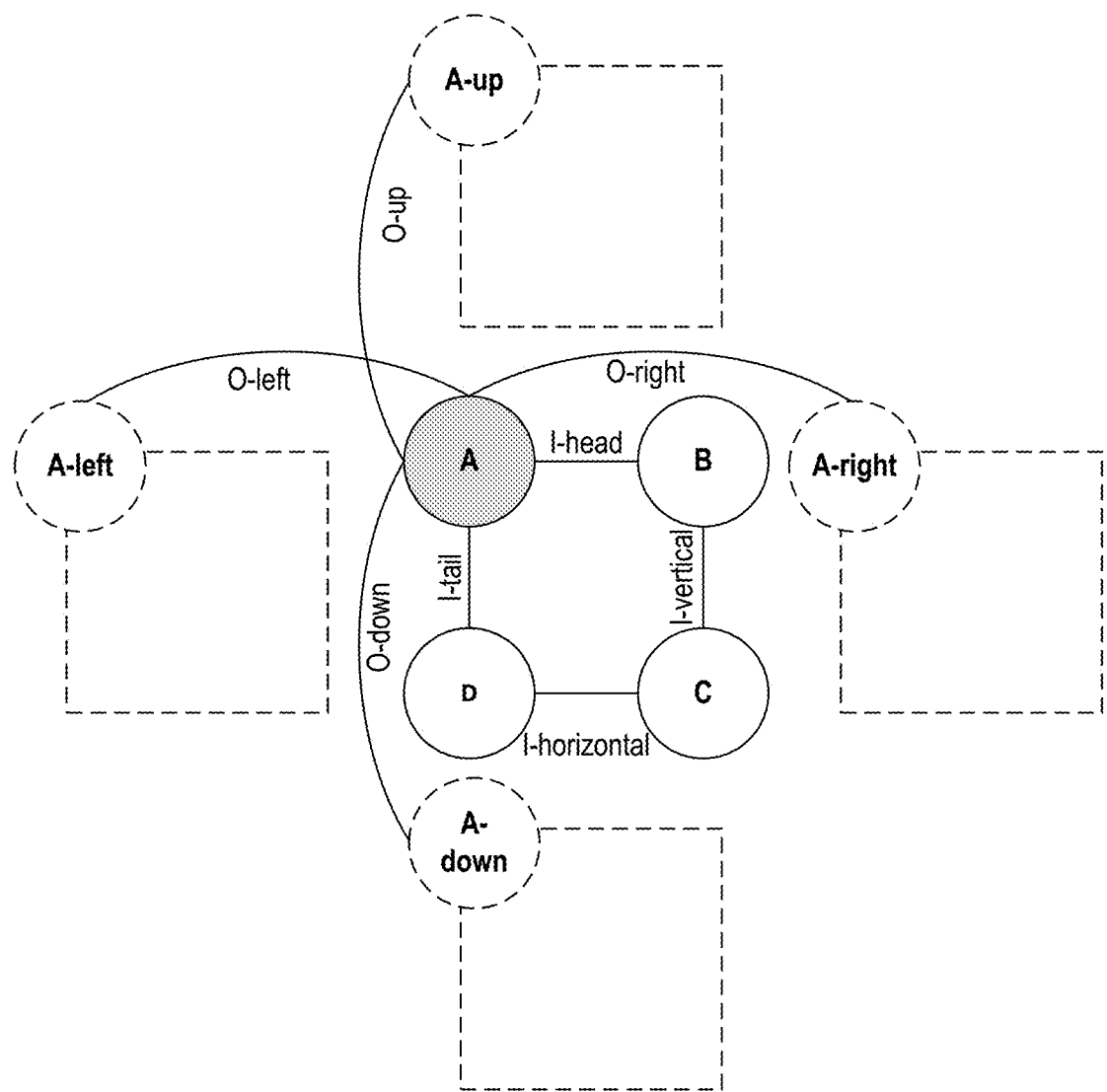
FIG. 4 illustrates an exemplary connection of a computing node with surrounding computing nodes in a hyper-square interconnect topology, according to some embodiments of the disclosure.

To create the novel hyper-square interconnect topology, connections of each computing node is re-designed. FIG. 4 illustrates an exemplary connection of a computing node with surrounding computing nodes in a hyper-square interconnect topology, according to some embodiments of the disclosure. According to FIG. 4, interconnect topology comprises computing nodes A, B, C, D, A-up, A-left, A-right, and A-down. In some embodiments, computing nodes A, B, C, and D can form a group of computing nodes, and computing nodes A-up, A-left, A-right, and A-down belong to different groups of computing nodes. In some embodiments, all of the computing nodes can be processors (e.g., processors 165, 166, 171, and 172 of distributed system 100 in FIG. 3A). In some embodiments, the computing nodes can be artificial intelligence ("AI") training chips, or AI training processors. In some embodiments, the computing nodes can be accelerators, such as neural processing units ("NPUs") or graphic processing units ("GPUs").

According to FIG. 4, each of the four computing nodes A, B, C, and D are positioned at four corners of a rectangle, and the four computing nodes are connected in a rectangular connection. In other words, computing node A is connected to computing node B via a connection I-head. Computing node A is connected to computing node D via a connection I-tail. Computing node B is connected to computing node C via a connection I-vertical. Computing node D is connected to computing node C via a connection I-horizontal. In some embodiments, the rectangular connection is a square connection.

Outside the rectangular connection of computing nodes A, B, C, and D, each of the computing nodes can also be connected to corresponding computing nodes in the adjacent rectangular connections of computing nodes. For example, computing node A is connected to a corresponding computing node A-up above via a connection O-up. Computing node A is connected to a corresponding computing node A-left to the left via a connection O-left. Computing node A is connected to a corresponding computing node A-down below via a connection O-down. Computing node A is connected to a corresponding computing node A-right to the right via a connection O-right. As a result, each computing node of computing nodes A, B, C, and D can have six connections. In some embodiments, the connections I-head, I-tail, I-horizontal, I-vertical, O-left, O-up, O-right, and O-down can be bi-directional. In some embodiments, the connections can be inter-chip interconnects as a part of an interconnect topology. In some embodiments, the connections can be formed using copper cables.

Figure 5:
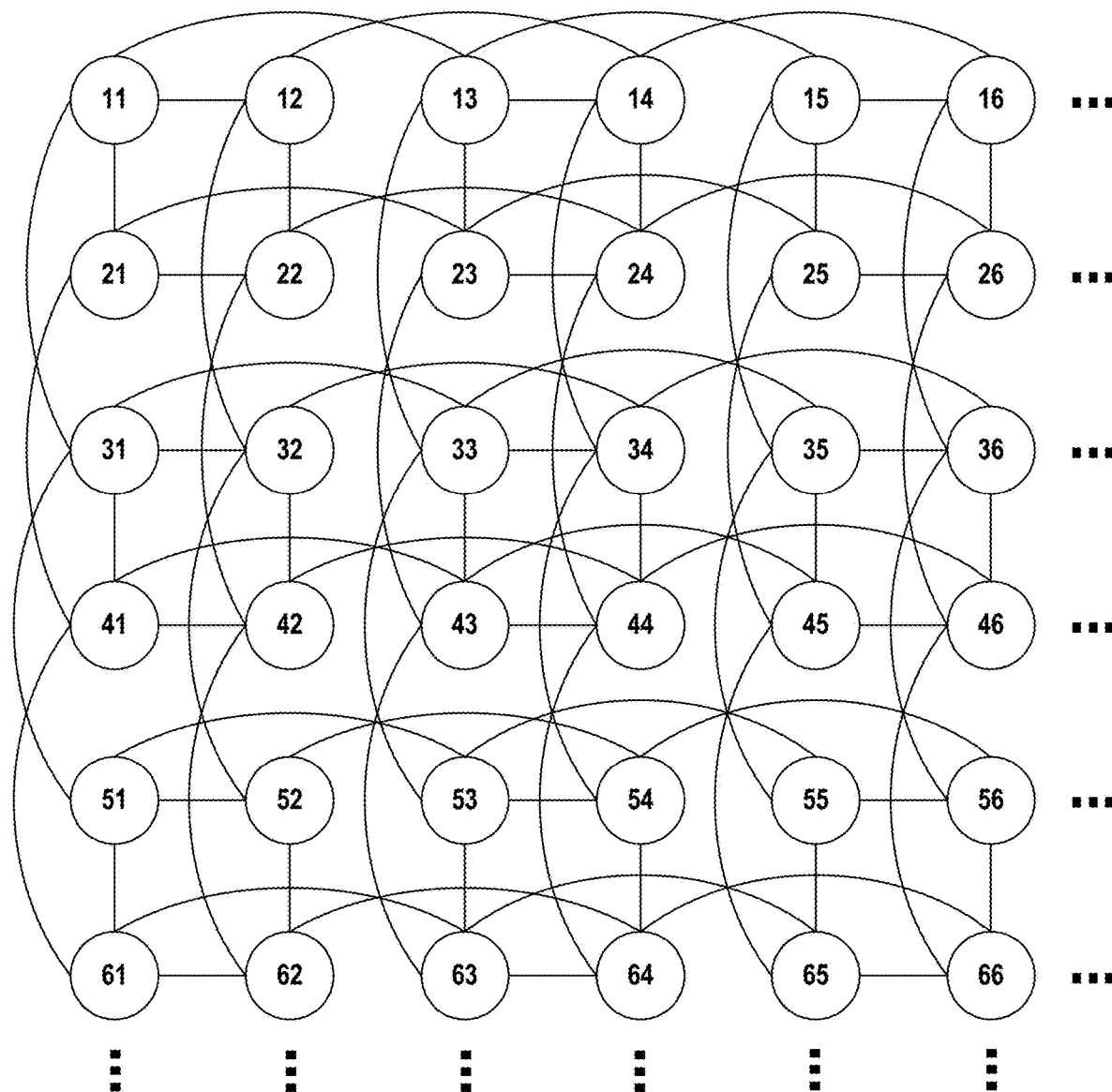
FIG. 5 illustrates an exemplary hyper-square interconnect topology, according to some embodiments of the disclosure.

Connections of computing nodes shown in FIG. 4 can be scaled up to form a hyper-square interconnect topology. FIG. 5 illustrates an exemplary hyper-square interconnect topology, according to some embodiments of the disclosure. According to FIG. 5, there are a plurality of computing nodes, comprising computing nodes 11-16, 21-26, 31-36, 41-46, 51-56, and 61-66. Each computing node has connections similar to the connections of computing nodes shown in FIG. 4. For example, computing node 33 can form a rectangular connection with computing nodes 34, 43, and 44, and computing node 33 can have six connections, similar to computing node A of FIG. 4. More specifically, computing node 33 is connected to computing nodes 34 and 43 as a part of the rectangular connection similar to computing nodes B and C of FIG. 4, and computing node 33 is connected to corresponding computing nodes 23, 31, 35, and 53, similar to computing nodes A-up, A-left, A-down, and A-right of FIG. 4. It is appreciated that none of the connections shown in FIG. 5 are long wires similar to the long wires shown in FIG. 2. As a result, the topology of FIG. 5 is an improvement over conventional interconnect topologies since the topology of FIG. 5 eliminates delays associated with long wirings.

Figure 6A:
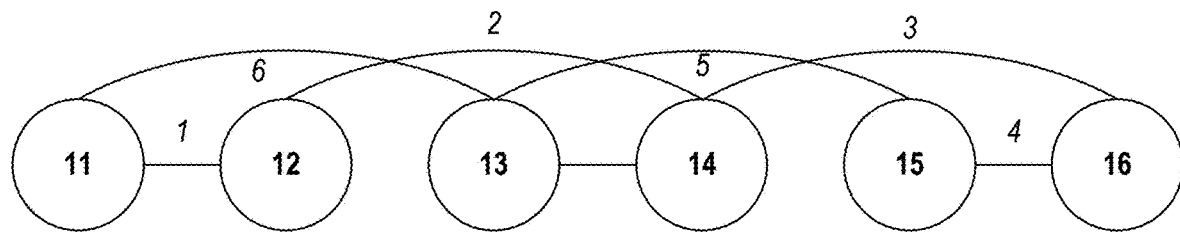
FIGS. 6A-C illustrate exemplary ring connections of a row of six computing nodes from a hyper-square interconnect topology, according to some embodiments of the present disclosure.
Figure 6B:
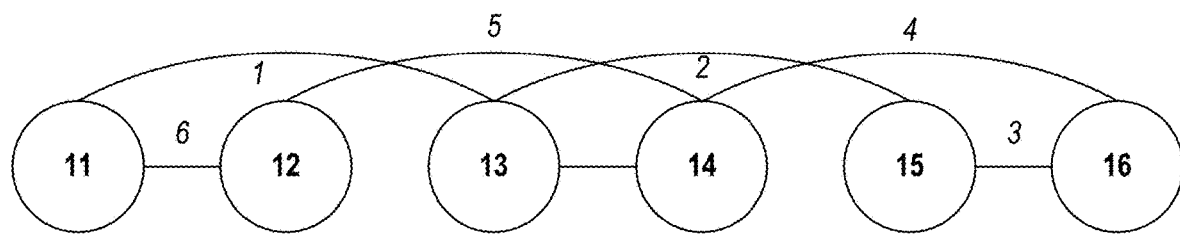
Figure 6C:
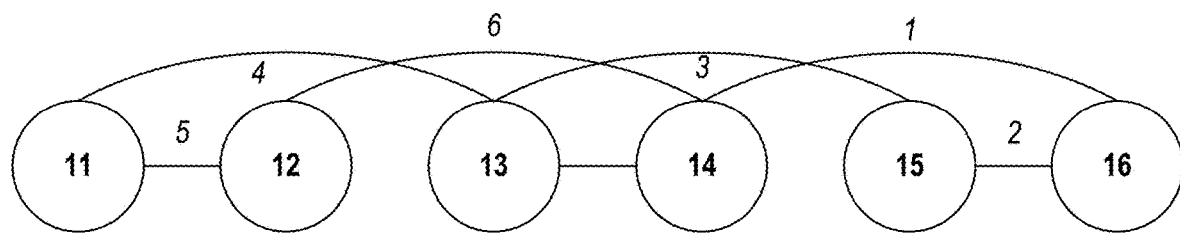

Using the topology of FIG. 5, a ring connection can be formed in each row or column of computing nodes. FIGS. 6A-C illustrate exemplary ring connections of a row of six computing nodes from a hyper-square interconnect topology, according to some embodiments of the present disclosure. As shown in FIG. 6A, there are six computing nodes that are aligned horizontally in a row, namely computing nodes 11, 12, 13, 14, 15, and 16. In addition, there are seven connections between the computing nodes, namely connections 11-12, 11-13, 12-14, 13-14, 13-15, 14-16, and 15-16. It is appreciated that computing nodes 11-16 of FIGS. 6A-C can be the computing nodes 11-16 of FIG. 5 or represent any other row or column of computing nodes in FIG. 5.

According to the connections shown in FIG. 6A, a ring connection can be formed as 11-12-14-16-15-13-11. In other words, the ring connection can be formed by traversing connections 11-12, 12-14, 14-16, 16-15, 15-13, and 13-11 in order. As shown in FIG. 6A, the order of the connections to be traversed is indicated on the connections. Each computing node on the ring connection can forward data packets along the ring connection.

In some embodiments, the connections are bi-directional. As a result, each ring connection can be traversed in both forward and backward directions. For example, as shown in FIG. 6B, the ring connection 11-12-14-16-15-13-11 can be traversed with connections 11-13, 13-15, 15-16, 16-14, 14-12, and 12-11 in order. It is appreciated the ring connection can also be formed by aligning computing nodes vertically in a column.

It is appreciated that a ring connection can be formed starting in any of the computing nodes. For example, as shown in FIG. 6C, a ring connection can start on computing node 14, and can be formed as 14-16-15-13-11-12-14. In other words, the ring connection can be formed by traversing connections 14-16, 16-15, 15-13, 13-11, 11-12, and 12-14 in order. As shown in FIG. 6C, the order of the connections to be traversed is indicated on the connections.

Figure 7A:
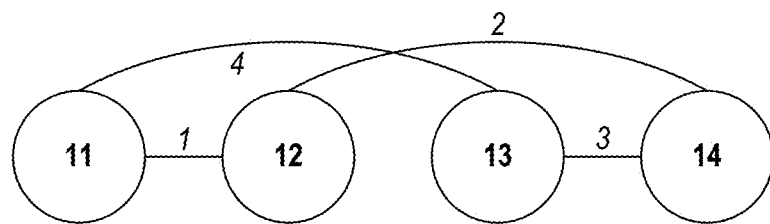
FIGS. 7A-C illustrate exemplary ring connections of a row of four computing nodes from a hyper-square interconnect topology, according to some embodiments of the present disclosure.
Figure 7B:
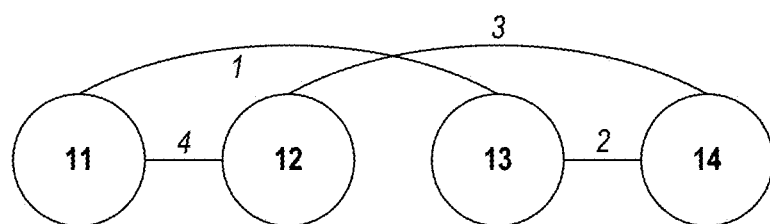
Figure 7C:
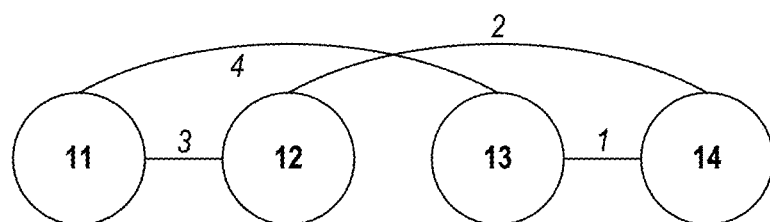

FIGS. 7A-C illustrate exemplary ring connections of a row of four computing nodes from a hyper-square interconnect topology, according to some embodiments of the present disclosure. As shown in FIG. 7A, there are four computing nodes in a row, namely computing nodes 11, 12, 13, and 14. In addition, there are four connections, namely connections 11-12, 11-13, 12-14, and 13-14. In some embodiments, computing nodes 11-14 of FIGS. 7A-C can be the computing nodes 11-14 of FIGS. 6A-C.

According to the connections shown in FIG. 7A, a ring connection can be formed as 11-12-14-13-11. In other words, the ring connection can be formed by traversing connections 11-12, 12-14, 14-13, and 13-11 in order as shown in FIG. 7A. Each computing node on the ring connection can forward data packets along the ring connection.

In some embodiments, the connections are bi-directional. As a result, each ring connection can be traversed in both forward and backward directions. For example, as shown in FIG. 7B, the ring connection 11-12-14-13-11 can be traversed with connections 11-13, 13-14, 14-12, and 12-11 in order. As shown in FIG. 7B, the order of the connections to be traversed is indicated on the connections. It is appreciated the ring connection can also be formed by aligning computing nodes vertically in a column.

It is appreciated that a ring connection can be formed starting in any of the computing nodes. For example, as shown in FIG. 7C, a ring connection can start on computing node 13, and can be formed as 13-14-12-11-13. In other words, the ring connection can be formed by traversing connections 13-14, 14-12, 12-11, and 11-13 in order. As shown in FIG. 7C, the order of the connections to be traversed is indicated on the connections.

Figure 8:
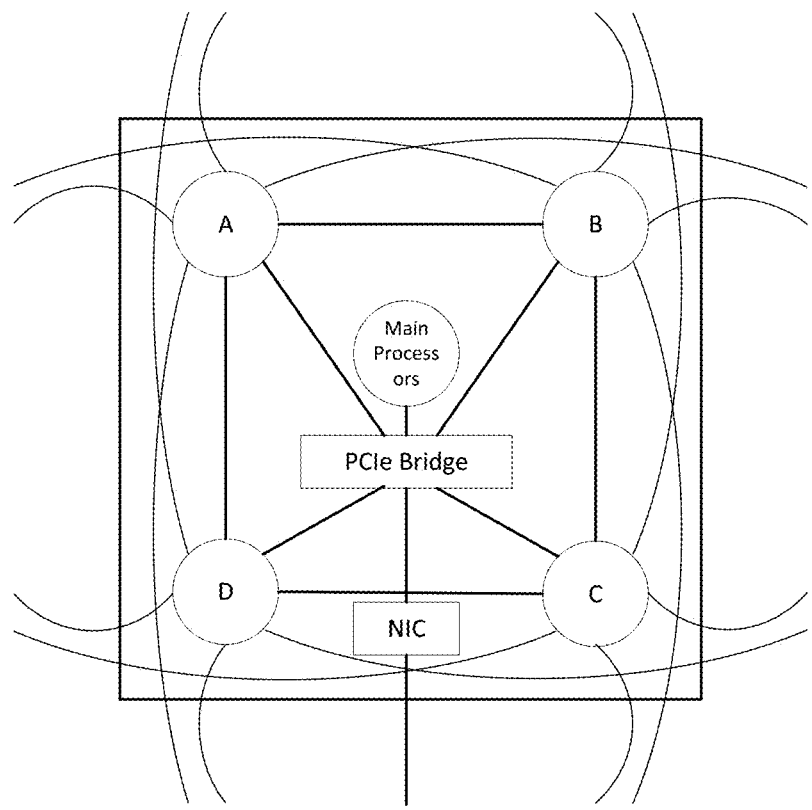
FIG. 8 illustrates an exemplary board in a computing cluster using a hyper-square interconnect topology, according to some embodiments of the present disclosure.

In some embodiments, the hyper-square interconnect topology can be implemented to form a computing cluster that comprises one or more boards of computing nodes. FIG. 8 illustrates an exemplary board in a computing cluster using a hyper-square interconnect topology, according to some embodiments of the present disclosure. As shown in FIG. 8, computing nodes A-D forms a group of computing nodes. The board comprises four computing nodes A-D, one or more main processors, and a hardware bridge.

In some embodiments, computing nodes A-D are similar to computing nodes A-D shown in FIG. 4. In some embodiments, computing nodes A-D are connected via inter-chip interconnects. The inter-chip interconnects connecting computing nodes A-D can be referred to as intra-board interconnects. In some embodiments, each of computing nodes A-D is connected with corresponding computing nodes of neighboring boards via inter-chip interconnects. The inter-chip interconnects connecting computing nodes A-D with corresponding computing nodes of neighboring boards are referred to as inter-board interconnects.

In some embodiments, the one or more main processors can be one or more CPUs, similar to main processors 117 of FIG. 3A. In some embodiments, the hardware bridge can be a peripheral component interconnect express ("PCIe") bus, similar to bus 112 of FIG. 3A or FIG. 3B. In some embodiments, the PCIe can be connected with a network interface controller ("NIC"), similar to communication interface 118 of FIG. 3A. The NIC can be connected to an ethernet or an Infiniband ("IB") network, similar to network 122 of FIG. 3A. In some embodiments, the computing cluster is similar to computing cluster 180 of FIG. 3B. In some embodiments, the computing cluster is an AI computing cluster.

In some embodiments, the board shown in FIG. 8 is hosted in a server, similar to server 110 or 130 of FIG. 3A or FIG. 3B. In some embodiments, the server can host multiple boards.

In some embodiments, four computing nodes and a CPU are integrated onto a board, as shown in FIG. 8. In some embodiments, computing nodes A-D can be AI training chips or AI training processors. In some embodiments, computing nodes A-D can be accelerators involved with AI training chips or AI training processors, such as an NPU or a GPU. Each of the computing nodes A-D can be connected to the one or more main processors via the hardware bridge. Each of the computing nodes A-D can have 6 ports. Each port can comprise 8 lanes of communication. The lanes of communication can be 112 Gbps based on a serializer/deserializer ("SerDes") architecture.

In many of the conventional data center network systems, communications among computing nodes on different boards rely on PCIe buses and conventional Ethernet or D3 networks. It is appreciated that the board shown in FIG. 8 is unlike conventional data center network systems, since the board can use inter-chip interconnects for direct communications among computing nodes on different boards (e.g., inter-chip interconnects between processor 165 and 166 in FIG. 3A). Compared with the PCIe buses and ethernet or IB networks, the inter-chip interconnects can offer a faster and more efficient communications among the computing nodes.

Figure 9:
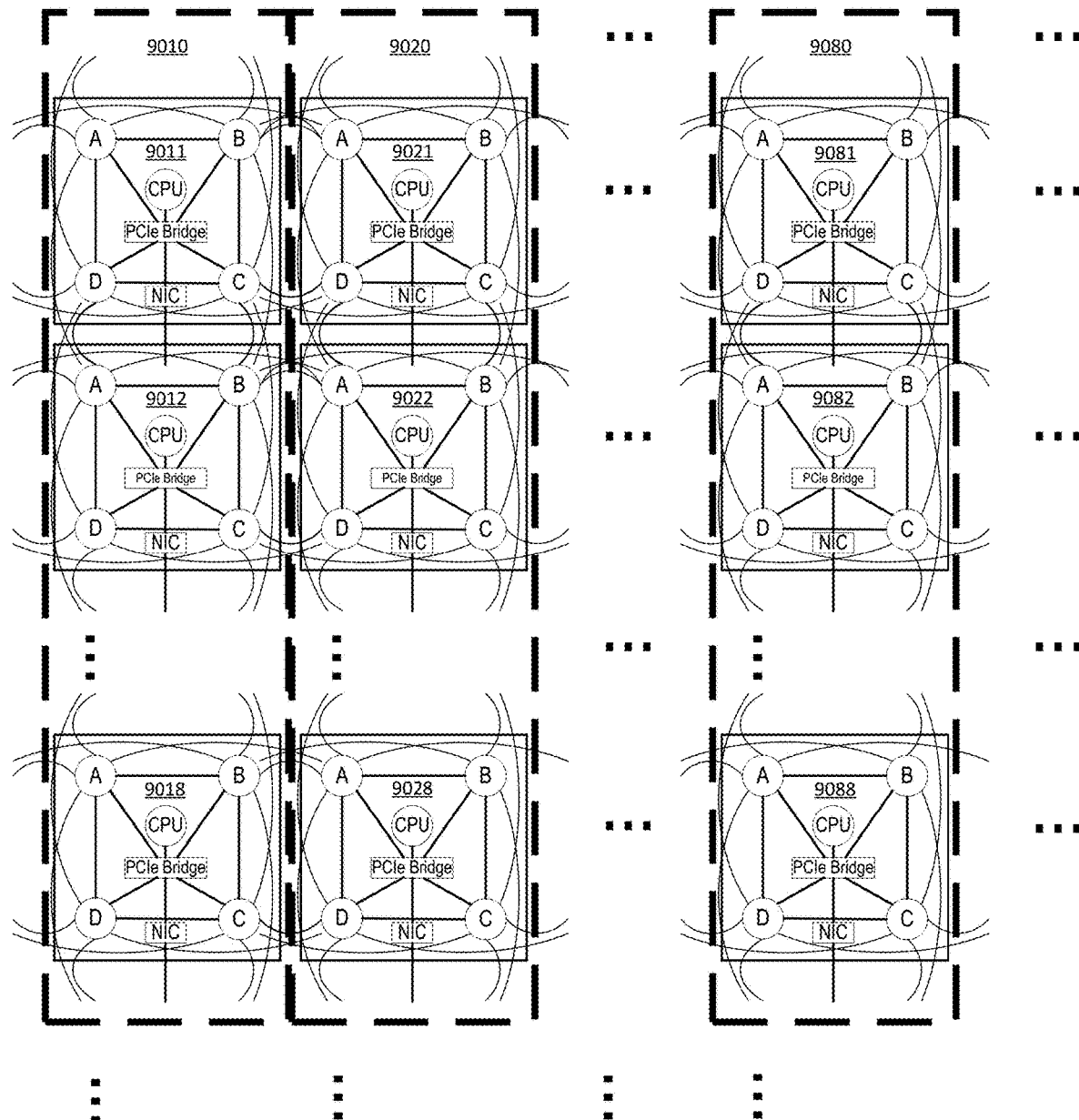
FIG. 9 illustrates an exemplary computing cluster comprising boards of computing nodes, according to some embodiments of the disclosure.

In some embodiments, multiple boards shown in FIG. 8 can be arranged to form a computing cluster. FIG. 9 illustrates an exemplary computing cluster comprising boards of computing nodes, according to some embodiments of the disclosure. As shown in FIG. 9, each board can comprise four computing nodes A-D, one or more main processors, and a hardware bridge. In some embodiments, computing nodes A-D are similar to computing nodes A-D shown in FIG. 4. In some embodiments, the one or more main processors can be central processing units ("CPUs"), similar to main processors 117 of FIG. 3A. In some embodiments, the hardware bridge can be a peripheral component interconnect express ("PCIe") bus, similar to bus 112 of FIG. 3A or FIG. 3B. In some embodiments, the computing cluster is similar to computing cluster 180 of FIG. 3B. In some embodiments, the computing cluster is an artificial intelligence ("AI") computing cluster. In some embodiments, the boards are similar to the board shown in FIG. 8.

In some embodiments, the boards can be stacked vertically to form a rack. For example, as shown in FIG. 9, boards 9011-9018 can be stacked vertically to form rack 9010. In each rack, a computing node in a board can be connected via inter-chip interconnect to a corresponding computing node in a neighboring board above or below. For example, as shown in FIG. 9, computing node A of board 9012 is connected with computing node A of board 9011 and computing node A of board 9013 (not shown on FIG. 9). In some embodiments, the boards at the top or the bottom of the rack is connected to only one computing node of a neighboring board that is either above or below. For example, board 9011 is located at the top of rack 9010. As a result, computing node A of board 9011 is only connected to computing node A of board 9012 that is below board 9011, since there are no boards above board 9011. In some embodiments, a part of a rack or the entire rack can be hosted in a server, similar to servers 110 and 130 of FIG. 3A or FIG. 3B. It is appreciated that a rack can also be formed by stacking boards horizontally.

In some embodiments, multiple racks can be aligned horizontally to form a computing cluster. For example, as shown in FIG. 9, racks 9010-9080 are aligned horizontally, and computing nodes of each board inside the racks are connected via inter-chip interconnects to corresponding computing nodes in neighboring boards to the left or the right. For example, computing node A of board 9022 is connected to computing node A of board 9012 and computing node A of board 9032 (not shown in FIG. 9). In some embodiments, the boards at the left or the right of the computing cluster is connected to only one computing node of a neighboring board that is either to the left or the right. For example, board 9011 is located at the left of the computing cluster. As a result, computing node A of board 9011 is only connected to computing node A of board 9021 that is to the right of board 9011, since there are no boards to the left of board 9011. It is appreciated that a computing cluster can also be formed by stacking racks vertically.

It is appreciated that by stacking boards horizontally and vertically, the computing cluster shown in FIG. 9 can be scaled up endlessly with no limitations. In some embodiments, a data center hosting the computing cluster can have a ceiling, and the height of the ceiling can be limited. As a result, the height of the rack may not be taller than the height of the ceiling. One way to solve this issue is to add another rack in front of or behind the rack, parallel to the rack. The computing nodes in the top board of the rack can be connected with the computing nodes in the top board of the newly added rack. The connections can be a part of the inter-chip interconnects. The newly added rack can further scale up by adding another rack and connecting the computing nodes on the boards that are located at the bottom of the racks. As a result, the scalability of the computing cluster is not affected by the dimensions of the data center's rooms. It is appreciated that the vertical scaling is also applicable horizontally.

Figure 10:
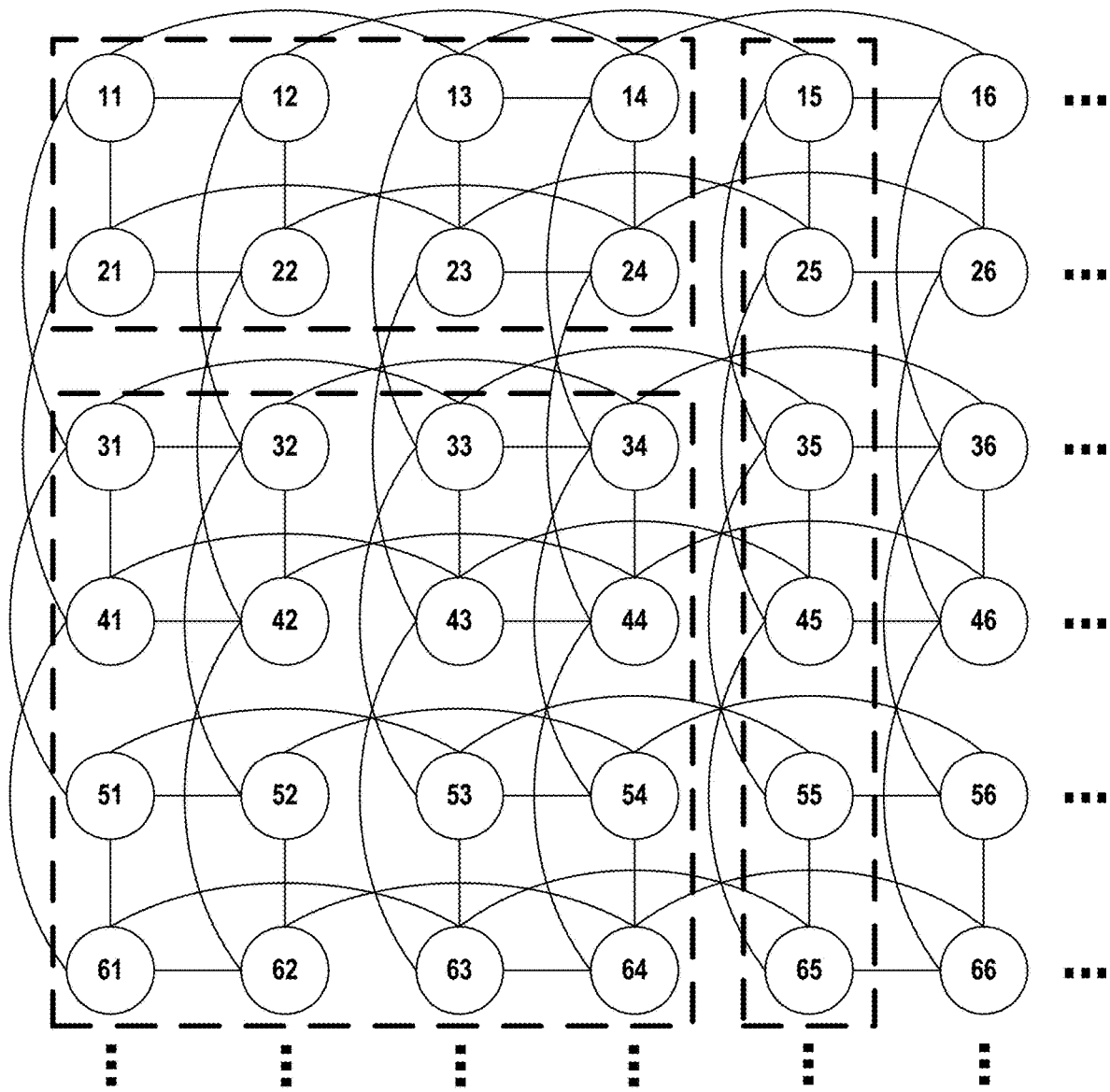
FIG. 10 illustrates an exemplary hyper-square interconnect topology divided into sub-sections, according to some embodiments of the disclosure.

Another advantage for hyper-square interconnect topologies shown in FIG. 4, FIG. 5, FIG. 8, and FIG. 9 and the ring connections shown in FIGS. 6A-C and FIGS. 7A-C is that each of the hyper-square interconnect topologies can be divided into sub-sections, with each sub-section being assigned a different computing task. FIG. 10 illustrates an exemplary hyper-square interconnect topology divided into sub-sections, according to some embodiments of the disclosure. It is appreciated that the hyper-square interconnect topology can be similar to the hyper-square interconnect topology of FIG. 5.

According to FIG. 10, computing nodes 11, 12, 21, 22, 13, 14, 23, and 24 of the hyper-square interconnect topology shown can be grouped into a sub-section. Ring connections can still be formed for each group of horizontally aligned computing nodes. For example, a ring connection can be formed for the horizontally aligned computing nodes 11, 12, 13, and 14 with a connection 11-12-14-13-11. In another example, computing nodes 31, 32, 41, 42, 33, 34, 43, 44, 51, 52, 61, 62, 53, 54, 63, and 64 of the hyper square interconnect topology shown in FIG. 10 can be grouped into a sub-section. Ring connections can be formed for each group of horizontally or vertically aligned computing nodes. In another example, computing nodes 15, 25, 35, 45, 55, and 65 of the hyper square interconnect topology shown in FIG. 10 can be grouped into a sub-section. A ring connection can be formed in a similar manner as the connections shown in FIGS. 6A-C.

In some embodiments, a square sub-section is preferred for routing purposes. For example, the sub-section comprising computing nodes 31-34, 41-44, 51-54, and 61-64 has four computing nodes on each side, forming a square. For routing purposes, this sub-section can be more preferred than the sub-section comprising computing nodes 15, 25, 35, 45, 55, and 65. As a result, when the system divides up the computing nodes into sub-sections to better allocate computing tasks, the system can be optimized to divide up the computing nodes by maximizing the number of square sub-sections. In some embodiments, the system can be optimized to select square sub-sections first for each computing task.

It is appreciated that the sizes of the sub-sections are highly flexible. For example, each sub-section can comprise 8 computing nodes or all computing nodes in the hyper-square interconnect topology. This flexibility allows the hyper-square interconnect topology to utilize the computing nodes more efficiently by assigning appropriate numbers of computing nodes to each computing task based on the computing need of the computing task.

Figure 11:
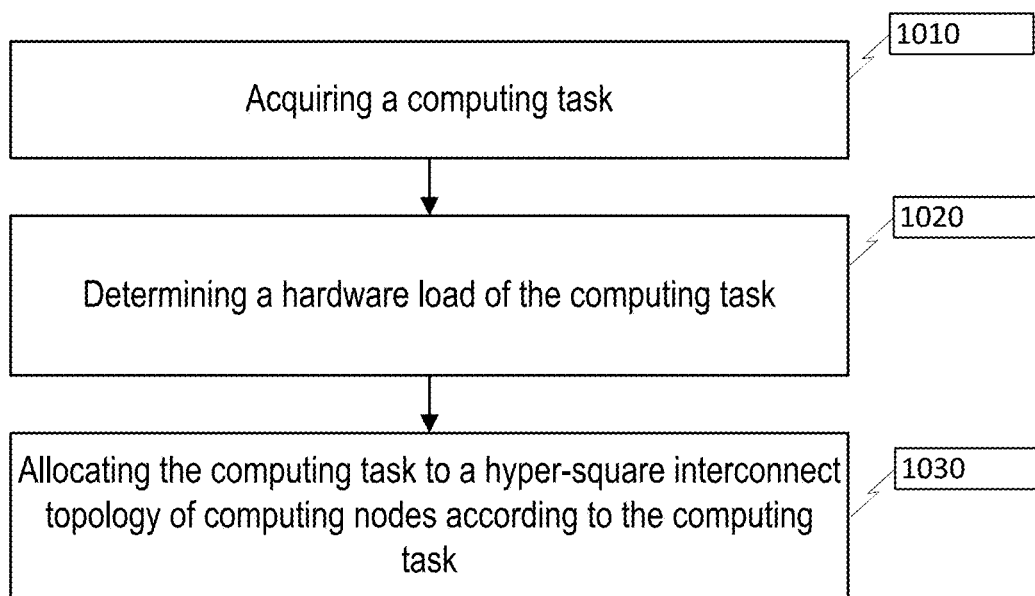
FIG. 11 illustrates a flowchart of an exemplary method for arranging computing nodes in a hyper-square interconnect topology, according to some embodiments of the disclosure.

Embodiments of the present disclosure further provides a method that can arrange computing nodes in a hyper-square interconnect topology to different computing tasks. FIG. 11 illustrates a flowchart of an exemplary method for arranging computing nodes in a hyper-square interconnect topology, according to some embodiments of the disclosure. It is appreciated that method 1000 of FIG. 11 may be performed by a host server or other servers (e.g., server 110 or 130 of FIG. 3A or FIG. 3B) in a distributed system (e.g., distributed system 100 of FIG. 3A). It is also appreciated that method 1000 of FIG. 11 may be performed on a hyper-square interconnect topology, similar to the hyper-square interconnect topology of FIG. 5, FIG. 9 or FIG. 10.

In step 1010, a computing task is acquired. In some embodiments, the computing task is acquired from user input or system generation. In some embodiments, the computing task is acquired from storage devices (e.g., storage devices 114 of FIG. 3A). In some embodiments, the computing task is an AI computing task. In some embodiments, multiple computing tasks are acquired simultaneously.

In step 1020, a hardware load of the computing task is determined. The hardware load refers to the amount of hardware resources that is suitable for the computing task. In some embodiments, the hardware load is based on a number of computing nodes or a number of boards of computing nodes in the hyper-square interconnect topology. The number of computing nodes determined to be suitable for the computing task may not exceed the total number of computing nodes in the hyper-square interconnect topology. Similarly the number of boards of computing nodes determined to be suitable for the computing task may not exceed the total number of boards in the hyper-square interconnect topology.

In step 1030, the computing task is allocated to the hyper-square interconnect topology according to the hardware load. In some embodiments, the allocation comprises dividing the computing nodes or the boards in the hyper-square interconnect topology into sub-sections. One of the sub-sections comprises enough computing nodes or boards based on the hardware load of the computing task. For example, the computing task can be allocated to a sub-section similar to the sub-section of computing nodes 11, 12, 21, 22, 13, 14, 23, and 24 shown in FIG. 10. In some embodiments, there can be multiple computing tasks received, and each computing task of the multiple computing tasks can be allocated to a separate sub-section.

In some embodiments, at least one of the sub-sections can form a ring connection using inter-chip interconnects, similar to the ring connections of FIGS. 6A-C or FIGS. 7A-C. The ring connection can comprise inter-board interconnects that forward data packets between computing nodes. The data packets can be generated from the computing nodes performing the computing task. In some embodiments, all sub-sections can form at least a ring connection using inter-chip interconnects.

Figure 12:
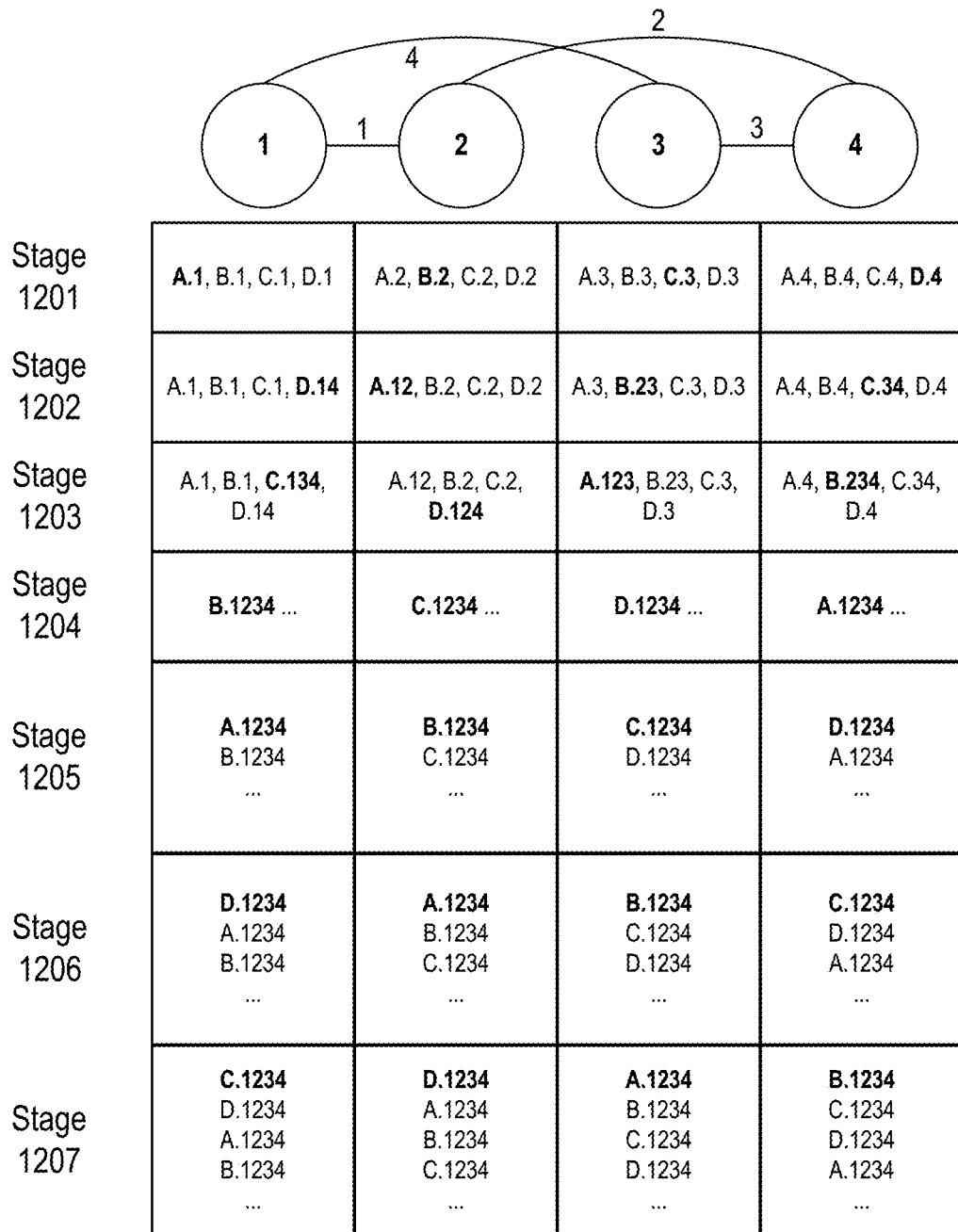
FIG. 12 illustrates an exemplary implementation of a one-dimensional routing for executing an AllReduce algorithm on a hyper-square interconnect topology, according to some embodiments of the present disclosure.

Embodiments of the present disclosure further provide a one-dimensional routing algorithm for executing an AllReduce algorithm using hyper-square interconnect topology. FIG. 12 illustrates an exemplary implementation of a one-dimensional routing for executing an AllReduce algorithm on a hyper-square interconnect topology, according to some embodiments of the present disclosure. As shown in FIG. 12, the AllReduce algorithm can be implemented on four computing nodes 1, 2, 3, and 4 that are connected by four connections 1, 2, 3, and 4. In some embodiments, computing nodes 1, 2, 3, and 4 are similar to computing nodes 11, 12, 13, and 14 of FIGS. 7A-C, and connections 1, 2, 3, and 4 are similar to connections 11-12, 12-14, 14-13, and 13-11 of FIGS. 7A-C. It is appreciated that the AllReduce algorithm can be executed by main processor 117 or server 110 of FIG. 3.

At stage 1201, each computing node comprises a version of four variables, namely variables A, B, C, and D. Each version of a variable can be represented as a concatenation of the variable's name and the name of the computing node that comprises the variable. For example, variable A in computing node 1 can be represented by variable version A.1. In some embodiments, each version of a variable can comprise different values across different computing nodes. For example, variable version A.1 of computing node 1 can comprise values that are different from variable version A.2 of computing node 2.

At stage 1202, data transfers are conducted across the computing nodes using the connections to reduce variables versions. For example, variable version A.1 from computing node 1 is transferred to computing node 2. Each transferred variable version is then reduced with the local version of the variable. For example, after being transferred to computing node 2, variable version A.1 is reduced with variable version A.2 in computing node 2. The reduced version of the variable can be labelled as a concatenation of the variable's name and the names of the computing nodes that comprise the versions of the variable at stage 1201. For example, after variable version A.1 is reduced with variable version A.2, the new variable version can be represented as A.12 in computing node 2.

Similar data transfers can be conducted across the other computing nodes using the connections to reduce other variable versions. For example, variable version B.2 from computing node 2 is transferred to computing node 3 to form B.23, variable version C.3 from computing node 3 is transferred to computing node 4 to form C.34, and variable version D.4 from computing node 4 is transferred to computing node 1 to form D.14.

At stage 1203, data transfers are conducted across the computing nodes using the connections to further reduce variable versions. For example, variable version A.12 from computing node 2 is transferred to computing node 3. Each transferred variable version is then reduced with the local version of the variable. For example, after being transferred to computing node 3, variable version A.12 is reduced with variable version A.3 in computing node 3. The reduced version of the variable can be labelled as a concatenation of the variable's name and the names of the computing nodes that comprise the versions of the variable at stage 1201. For example, after variable version A.12 is reduced with variable version A.3, the new variable version can be represented as A.123.

Similar data transfers can be conducted across the other computing nodes using the connections to further reduce other variable versions. For example, variable version B.23 from computing node 3 is transferred to computing node 4, variable version C.34 from computing node 4 is transferred to computing node 1, and variable version D.14 from computing node 1 is transferred to computing node 2.

At stage 1204, data transfers are conducted across the computing nodes using the connections to further reduce variable versions. For example, variable version A.123 from computing node 3 is transferred to computing node 4. Each transferred variable version is then reduced with the local version of the variable. For example, after being transferred to computing node 4, variable version A.123 is reduced with variable version A.4 in computing node 4. The reduced version of the variable can be labelled as a concatenation of the variable's name and the names of the computing nodes that comprise the versions of the variable at stage 1201. For example, after variable version A.123 is reduced with variable version A.4, the new variable version can be represented as A.1234.

Similar data transfers can be conducted across the other computing nodes using the connections to further reduce other variable versions. For example, variable version B.234 from computing node 4 is transferred to computing node 1, variable version C.134 from computing node 1 is transferred to computing node 2, and variable version D.124 from computing node 2 is transferred to computing node 3.

At the end of stage 1204, each computing node comprises a version of a variable that was fully reduced from all versions of the variable. For example, computing node 1 comprises variable version B.1234, which was reduced from all variable versions of variable B. For clarity purposes, only these variables are displayed on FIG. 12.

At stage 1205 data transfers are conducted across the computing nodes using the connections to broadcast variable versions. For example, variable version A.1234 from computing node 4 is transferred to computing node 1. At the end of stage 1205, each computing node comprises two variables with the fully reduced versions. For example, computing node 1 comprises variable versions A.1234 and B.1234.

Similar data transfers can be conducted across other computing nodes using the connections to broadcast variable versions. For example, variable version B.1234 from computing node 1 is transferred to computing node 2, variable version C.1234 from computing node 2 is transferred to computing node 3, and variable version D.1234 from computing node 3 is transferred to computing node 4.

At stage 1206, data transfers are conducted across the computing nodes using the connections to further broadcast variable versions. For example, variable version A.1234 from computing node 1 is transferred to computing node 2. At the end of stage 1206, each computing node comprises three variables with the fully reduced versions. For example, computing node 1 comprises variable versions A.1234, B.1234, and C.1234.

Similar data transfers can be conducted across other computing nodes using the connections to further broadcast variable versions. For example, variable version B.1234 from computing node 2 is transferred to computing node 3, variable version C.1234 from computing node 3 is transferred to computing node 4, and variable version D.1234 from computing node 4 is transferred to computing node 1.

At stage 1207, data transfers are conducted across the computing nodes using the connections to further broadcast variable versions. For example, variable version A.1234 from computing node 2 is transferred to computing node 3, variable version B.1234 from computing node 3 is transferred to computing node 4, variable version C.1234 from computing node 4 is transferred to computing node 1, and variable version D.1234 from computing node 1 is transferred to computing node 2. At the end of stage 1207, each computing node comprises all four variables with the fully reduced versions. For example, computing node 1 comprises variable versions A.1234, B.1234, C.1234, and D.1234.

Similar data transfers can be conducted across other computing nodes using the connections to further broadcast variable versions. For example, variable version B.1234 from computing node 3 is transferred to computing node 4, variable version C.1234 from computing node 4 is transferred to computing node 1, and variable version D.1234 from computing node 1 is transferred to computing node 2.

As shown in FIG. 12, the AllReduce algorithm can be performed on a ring connection between four computing nodes 1, 2, 3, and 4. Since none of the Connections 1, 2, 3, and 4 comprises long wirings, delays associated with each stage of data transfer is controlled. This is a significant improvement over ring connections in conventional torus topologies (e.g., torus topology of FIG. 2).

It is appreciated that the AllReduce algorithm in FIG. 12 can be performed by transferring variable versions in any direction. For example, in stage 1202, the data transfers can be in a reverse direction: variable version A.1 from computing node 1 is transferred to computing node 4, variable version B.2 from computing node 2 is transferred to computing node 1, variable version C.3 from computing node 3 is transferred to computing node 2, and variable version D.4 from computing node 4 is transferred to computing node 3. The subsequent stages can also adjust their orderings of data transfers, so that at the end of stage 1207, each computing node comprises all four variables with the fully reduced versions.

It is also appreciated that the AllReduce algorithm in FIG. 12 can be performed using any set of variable versions at stage 1201. For example, instead of selecting variable versions A.1, B.2, C.3, and D.4 for data transferring at stage 1202, variable versions A.2, B.3, C.4, and D1 can also be selected for data transferring. The general rule is that each set of variable versions comprises one variable of each of the variables A, B, C, and D. The subsequent stages can also adjust their variable versions for data transfers, so that at the end of stage 1207, each computing node comprises all four variables with the fully reduced versions.

It is also appreciated that the AllReduce algorithm in FIG. 12 can be performed on more than four computing nodes. For example, as shown in FIGS. 6A-C, a ring connection can be formed on computing nodes 11, 12, 13, 14, 15, and 16. At each stage where variables are reduced, a version of a variable is transferred along the connections, similar to stages 1202, 1203, and 1204 of FIG. 12. At each stage where variables are broadcasted, a fully reduced version of a variable is transferred along the connections, similar to stages 1205, 1206, and 1207 of FIG. 12.

Embodiments of the present disclosure further provide a two-dimensional routing algorithm for executing an AllReduce algorithm using hyper-square interconnect topology. FIG. 13 illustrates an exemplary implementation of a two-dimensional routing for executing an AllReduce algorithm on a hyper-square interconnect topology, according to some embodiments of the present disclosure. As shown in FIG. 13, the AllReduce algorithm can be implemented on four computing nodes 1, 2, 3, 4, 5, 6, 7, 8, 9, a, b, c, d, e, f, and g. It is appreciated that connections across each row or column of computing nodes can form a ring connection. In some embodiments, computing nodes of FIG. 13 are similar to a set of 16 neighboring computing nodes in FIG. 5 (e.g., computing nodes 31, 32, 33, 34, 41, 42, 43, 44, 51, 52, 53, 54, 61, 62, 63, and 64 of FIG. 5 or FIG. 10). It is appreciated that the AllReduce algorithm in FIG. 13 can be executed by main processor 117 or server 110 of FIG. 3.

At stage 1310, each computing node comprises a version of four variables, namely variables A, B, C, and D. Each version of a variable can be represented as a concatenation of the variable's name and the name of the computing node that comprises the variable. For example, variable A in computing node 1 can be represented by variable version A.1. In some embodiments, each version of a variable can comprise different values across different computing nodes. For example, variable version A.1 of computing node 1 can comprise values that are different from variable version A.2 of computing node 2 (e.g., as shown in example of the first variable of Worker A and Worker B in FIG. 1). For clarity purposes, only one variable version is displayed for each computing node on FIG. 13.

At stage 1320, each variable version displayed at stage 1310 is transferred and reduced three times along each row of computing nodes. In some embodiments, stage 1320 for each row of computing nodes is similar to a combination of stages 1202, 1203, and 1204 of FIG. 12. At the end of stage 1320, each computing node comprises a version of a variable that was fully reduced from all versions of the variable across the row. For example, computing node 1 comprises variable version B.1234, which was reduced from all variable versions of variable B along the row of computing nodes 1, 2, 3, and 4. In another example, computing node 9 comprises variable version B.9abc, which was reduced from all variable versions of variable B along the row of computing nodes 9, a, b, and c.

At stage 1330, each variable version displayed at stage 1320 is transferred and reduced three times along each column of computing nodes. In some embodiments, stage 1330 for each column of computing nodes is similar to a combination of stages 1202, 1203, and 1204 of FIG. 12 using a column of computing nodes (e.g., computing nodes 1, 5, 9, and d) instead of a row of computing nodes. At the end of stage 1330, each computing node comprises a version of a variable that was fully reduced from all versions of the variable across the row and the column. For example, computing node 1 comprises variable version B.all, which was reduced from variable versions B.1234, B.5678, B.9abc, and B.defg. In other words, variable version B.all is reduced from all of the variable versions for variable B. In another example, computing node 7 comprises variable version A.all, which was reduced from variable versions A.1234, A.5678, A.9abc, and A.defg. In other words, variable version A.all is reduced from all of the variable versions for variable A.

At stage 1340, each variable version displayed at stage 1330 is transferred three times along each row of computing nodes. In some embodiments, stage 1340 for each row of computing nodes is similar to a combination of stages 1205, 1206, and 1207 of FIG. 12. At the end of stage 1340, each computing node comprises all four variables with the fully reduced versions. For example, computing node 1 comprises variable versions A.all, B.all, C.all, and D.all (represented as A/B/C/D.all in FIG. 13). It is appreciated that each variable version displayed at stage 1330 can also be transferred along each column of computing nodes for broadcasting.

As shown in FIG. 13, the AllReduce algorithm can be performed using the ring connections along any row or column of computing nodes. Since none of the connections comprises long wirings, delays associated with each stage of data transfer is controlled. This is a significant improvement over ring connections in conventional torus topologies (e.g., torus topology of FIG. 2).

It is appreciated that the AllReduce algorithm in FIG. 13 can be performed by transferring variable versions in any direction. For example, at stage 1320, the data transfers can be in columns rather than in rows. Subsequently, data transfers at stage 1330 can be in rows rather than in columns.

It is also appreciated that the AllReduce algorithm in FIG. 13 can be performed using any set of variable versions at stage 1201. For example, instead of selecting variable versions A.1, B.2, C.3, and D.4 for data transferring at stage 1310, variable versions A.2, B.3, C.4, and D1 can also be selected for data transferring. The general rule is that each set of variable versions comprises one variable of each of the variables A, B, C, and D. The subsequent stages can also adjust their variable versions for data transfers, so that at the end of stage 1340, each computing node comprises all four variables with the fully reduced versions.

It is also appreciated that the AllReduce algorithm in FIG. 13 is not limited to be performed on sixteen computing nodes. In fact, the AllReduce algorithm in FIG. 13 can be performed on any number of computing nodes where a ring connection can be formed in each row or column of computing nodes. For example, as shown in FIG. 5, there are 36 computing nodes displayed, namely computing nodes 11-16, 21-26, 31-36, 41-46, 51-56, and 61-66. A ring connection can be formed along any row or column of computing nodes. At each stage where variables are reduced, a version of a variable is transferred along a row or a column, similar to stages 1320 and 1330 of FIG. 13. At each stage where variables are broadcasted, a fully reduced version of a variable is transferred along a row or a column, similar to stages 1340 of FIG. 13. Other examples where the AllReduce algorithm can be performed include the set of computing nodes 11-14 and 21-14 of FIG. 10 and the set of computing nodes 15, 25, 35, and 45 of FIG. 10.

Figure 14:
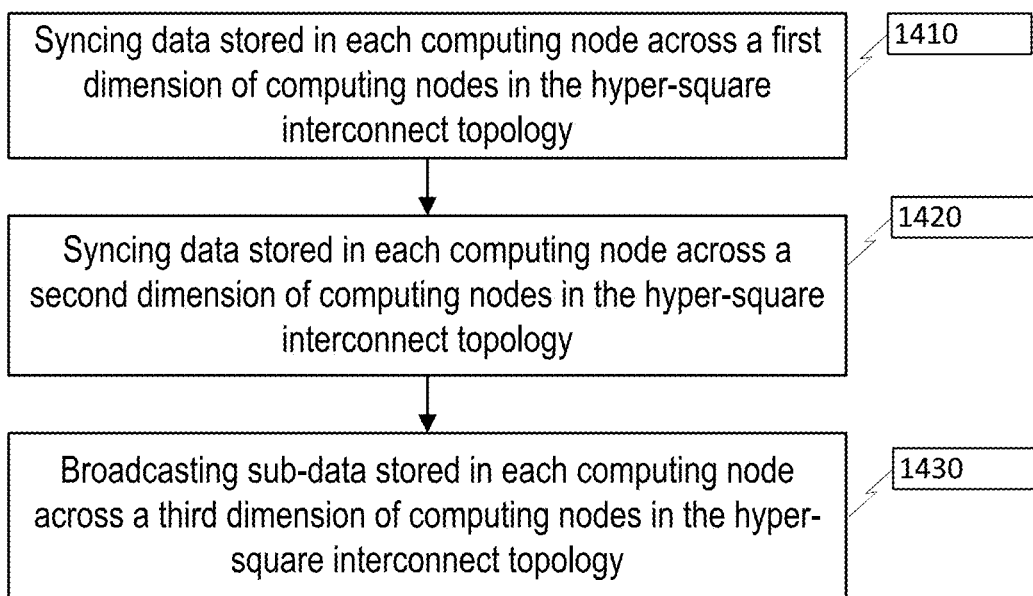
FIG. 14 illustrates a flowchart of an exemplary method for performing data syncing for a computing task in a hyper-square interconnect topology, according to some embodiments of the disclosure.

Embodiments of the present disclosure further provide a method to perform data syncing for a computing task in a hyper-square interconnect topology. FIG. 14 illustrates a flowchart of an exemplary method for performing data syncing for a computing task in a hyper-square interconnect topology, according to some embodiments of the disclosure. It is appreciated that method 1400 of FIG. 14 may be performed by a host server or other servers (e.g., server 110 or 130 of FIG. 3A or FIG. 3B) in a distributed system (e.g., distributed system 100 of FIG. 3A). It is also appreciated that method 1400 of FIG. 14 may be performed on a hyper-square interconnect topology, similar to the hyper-square interconnect topology of FIG. 5, FIG. 9 or FIG. 10.

Prior to executing method 1400, each computing node in the hyper-square interconnect topology comprises a version of data that is to be synced. In some embodiments, the data to be synced can comprise a plurality of sub-data, and each computing node can comprise a different version of each sub-data. In some embodiments, the data to be synced is similar to variables A, B, C, and D in FIG. 13. Each of the variables can be sub-data, and each computing node in FIG. 13 can comprise a version of variables A, B, C, and D (e.g., stage 1310 in FIG. 13).

In step 1410, sub-data stored in each computing node is synced along a first dimension of an array of computing nodes in the hyper-square interconnect topology. The first dimension of the array of computing nodes can be a row of computing nodes or a column of computing nodes. In some embodiments, in a unit time (e.g., a clock cycle), each computing node along the first dimension receives a version of sub-data transferred from another computing node in the row via a connection on a ring connection. Data transferring continues until each computing node along the first dimension receives all versions of a sub-data from all computing nodes in the row. In some embodiments, the data syncing in step 1410 is similar to stage 1320 of the AllReduce Algorithm in FIG. 13, or a combination of stages 1202, 1203, and 1204 of the AllReduce Algorithm in FIG. 12.

In step 1420, sub-data stored in each computing node is synced along a second dimension of the array of computing nodes in the hyper-square interconnect topology. The second dimension of the array can be a column of computing nodes or a row of computing nodes, and second dimension is different from the first dimension. For example, if the first dimension is a row of computing nodes, the second dimension may not be a row of computing nodes. The second dimension can be a column of computing nodes. In some embodiments, in a unit time (e.g., a clock cycle), each computing node along the second dimension receives a version of sub-data transferred from another computing node in the second dimension via a connection on a ring connection. Data transferring continues until each computing node along the second dimension receives all versions of a sub-data from all computing nodes. In some embodiments, the data syncing in step 1420 is similar to stage 1330 of the AllReduce Algorithm in FIG. 13, or a combination of stages 1202, 1203, and 1204 of the AllReduce Algorithm in FIG. 12. It is appreciated that when the array is one-dimensional, step 1410 may be sufficient to sync data, and it may not be necessary to execute step 1420.

In step 1430, sub-data stored in each computing node is broadcasted along a third dimension of the array of computing nodes in the hyper-square interconnect topology. In some embodiments, the third dimension of computing nodes can be a row or a column of computing nodes. In some embodiments, in a unit time (e.g., a clock cycle), each computing node along a row receives a sub-data transferred from another computing node in the row via a connection on a ring connection. Data transferring continues until all computing nodes along the row receives sub-data from all computing nodes. In some embodiments, the data syncing in step 1430 is similar to stage 1340 of the AllReduce Algorithm in FIG. 13, or a combination of stages 1205, 1206, and 1207 of the AllReduce Algorithm in FIG. 12. It is appreciated that the broadcasting in step 1430 can also be performed along each column of computing nodes, similar to stage 1340 of the AllReduce Algorithm in FIG. 13.

Since method 1400 of FIG. 14 can be performed on a hyper-square interconnect topology, the data syncing in method 1400 can be performed using the ring connections along any row or column of computing nodes. Since these connections minimize the use of long wirings, delays associated with each stage of data transfer is controlled. This is a significant improvement over ring connections in conventional torus topologies (e.g., torus topology of FIG. 2).

It is appreciated that method 1400 of FIG. 14 can be performed by transferring sub-data in any direction. For example, in step 1410, the data syncing can be performed along columns rather than rows. Subsequently, the data syncing in step 1420 can be performed in rows rather than in columns.

It is also appreciated that method 1400 of FIG. 14 can be performed using any combination of sub-data, similar to the AllReduce algorithm in FIG. 13.

It is also appreciated that method 1400 of FIG. 14 can be performed on any number of computing nodes, as long as each row or column of computing nodes can form a ring connection. For example, as shown in FIG. 5, there are 36 computing nodes displayed, namely computing nodes 11-16, 21-26, 31-36, 41-46, 51-56, and 61-66. A ring connection can be formed along any row or column of computing nodes. In each step where sub-data is synced, a version of a sub-data is transferred along a row or a column, similar to steps 1410 and 1420 of FIG. 14. In each step where variables are broadcasted, a fully synced sub-data is transferred along a row or a column, similar to step 1430 of FIG. 14.

Embodiments of the present disclosure can be further improved by implementing a parallel routing algorithm for executing an AllReduce algorithm in a hyper-square interconnect topology. For example, referring back to FIG. 13, each computing node is on a ring connection along a row or a column. Assuming that the connections are bi-directional and data can travel along connections in both forward and reverse directions simultaneously, each computing node have access to four ring connections. For example, computing node 1 has access to ring connection 1-2-4-3-1, 1-3-4-2-1, 1-5-d-9-1, and 1-9-d-5-1. Directions of each of the ring connections can be named X-go, X-come, Y-go, and Y-come, respectively. As a result, the four by four cluster shown in FIG. 13 can support four routes simultaneously, with X-go and X-come supporting 4 rings in the rows and Y-come and Y-go supporting 4 rings in the columns.

Since the cluster can support four routes simultaneously, all the data to be synced can be divided into four groups, with each group getting synced using one of the supported routes. For example, a first group of data can use X-go, Y-go, and X-come as directions for data transferring for each of the steps 1410, 1420, and 1430 respectively. The second group of data can use X-come, Y-come, and Y-go as directions for data transferring for each of the steps 1410, 1420, and 1430 respectively. The third group of data can use Y-go, X-come, Y-come for data transferring for each of the steps 1410, 1420, and 1430 respectively. And the fourth group of data can use Y-come, X-go, and Y-go for data transferring for each of the steps 1410, 1420, and 1430 respectively. As long as the routing directions are different at each step for each of the data groups, there is no conflicting in routing. As a result, data can be transferred and synced in parallel, providing significant improvement to execution efficiency to methods and implementations in embodiments of the present disclosure.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

The embodiments may further be described using the following clauses:

1. A method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group and a computing node A of a third group neighboring the first group, a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the method comprising:

syncing data across a first dimension of computing nodes using a first set of ring connections, wherein the first set of ring connections are formed using inter-group and intra-group interconnects that communicatively couple the computing nodes of the first group and the second group along the first dimension, and the syncing data across the first dimension comprises transferring, in a unit time, sub-data from a computing node along the first dimension to another computing node in a unit time via a connection on the first set of ring connections;

syncing data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the first dimension to another computing node in a unit time via a connection on the second set of ring connections; and broadcasting synced data across the first dimension or the second dimension of computing nodes using the first set of ring connections or the second set of ring connections.

2. The method of clause 1, wherein the data to be synced comprises a plurality of sub-data, and each computing node comprises a different version of each sub-data.

3. The method of clause 2, wherein:
syncing data across a first dimension of computing nodes using a first set of ring connections further comprises:
in a clock cycle, receiving a version of sub-data by each computing node in a row, wherein the version of the sub-data is transferred from another computing node in the row via the connection on the first set of ring connections; and
continuing data transferring until each computing node along the first dimension receives all versions of a sub-data from all computing nodes in the row.

4. The method of clause 3, wherein:
syncing data across a second dimension of computing nodes using a second set of ring connections further comprises:
in a clock cycle, receiving a version of sub-data by each computing node in a column, wherein the version of the sub-data is transferred from another computing node in the column via a connection on the second set of ring connections; and
continuing data transferring until each computing node along the second dimension receives all versions of a sub-data from all computing nodes.

5. The method clause 3, wherein broadcasting synced data across the first dimension or the second dimension of computing nodes using the first set of ring connections or the second set of ring connections further comprises:
in a clock cycle, receiving sub-data by each computing node across the first dimension or the second dimension, wherein the sub-data transferred from another computing node across the first dimension or the second dimension via the connection on the first set of ring connections or the connection on the second set of ring connections; and
continuing data transferring until all computing nodes along the first dimension or the second dimension receive sub-data from all computing nodes.

6. The method of clause 1, wherein the set of intra-group interconnects and the set of inter-group interconnects comprise inter-chip interconnects.

7. The method of clause 1, wherein the computing nodes are processors.

8. The method of clause 8, wherein the computing nodes are artificial intelligence ("AI") training processors, AI training chips, neural processing units ("NPU"), or graphic processing units ("GPU").

9. The method of clause 9, wherein the computing task is an AI computing task involving an allreduce algorithm.

10. A system for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, and a computing node A of a third group neighboring the first group a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the system comprising:

a memory storing a set of instructions; and
one or more processors configured to execute the set of instructions to cause the system to:

sync data across a first dimension of computing nodes using a first set of ring connections, wherein the first set of ring connections is formed using inter-group and intra-group interconnects that communicatively couple the computing nodes of the first group and the second group along the first dimension, and the syncing data across the first dimension comprises transferring, in a unit time, sub-data from a computing node along the first dimension to another computing node in a unit time via a connection on the first set of ring connections;

sync data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the second dimension to another computing node in a unit time via a connection on the second set of ring connections; and broadcast synced data across the first dimension or the second dimension of computing nodes using the first set of ring connections or the second set of ring connections.

11. The system of clause 10, wherein the data to be synced comprises a plurality of sub-data, and each computing node comprises a different version of each sub-data.

12. The system of clause 11, wherein the one or more processors are further configured to execute the set of instructions to cause the system to:

in a clock cycle, receive a version of sub-data by each computing node in a row, wherein the version of the sub-data is transferred from another computing node in the row via the connection on the first set of ring connections; and continue data transferring until each computing node along the first dimension receives all versions of a sub-data from all computing nodes in the row.

13. The system of clause 12, wherein the one or more processors are further configured to execute the set of instructions to cause the system to:

in a clock cycle, receive a version of sub-data by each computing node in a column, wherein the version of the sub-data is transferred from another computing node in the column via the connection on the second set of ring connections; and continue data transferring until each computing node along the second dimension receives all versions of a sub-data from all computing nodes.

14. The system of clause 11, wherein the one or more processors are further configured to execute the set of instructions to cause the system to:

in a clock cycle, receive sub-data by each computing node across the first dimension or the second dimension, wherein the sub-data transferred from another computing node across the first dimension or the second dimension via the connection on the first set of ring connections or the connection on the second set of ring connections; and continue data transferring until all computing nodes along the first dimension or the second dimension receive sub-data from all computing nodes.

15. The system of clause 10, wherein the set of intra-group interconnects and the set of inter-group interconnects comprise inter-chip interconnects.

16. The system of clause 10, wherein the computing nodes are processors.

17. The system of clause 16, wherein the computing nodes are artificial intelligence ("AI") training processors, AI training chips, neural processing units ("NPU"), or graphic processing units ("GPU").

18. The system of clause 17, wherein the computing task is an AI computing task involving an allreduce algorithm.

19. A non-transitory computer readable medium that stores a set of instructions that is executable by one or more processors of an apparatus to cause the apparatus to initiate a method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group and a computing node A of a third group neighboring the first group, a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the method comprising:

syncing data across a first dimension of computing nodes of the first group and the second group using a first set of ring connections, wherein the first set of ring connections are formed using inter-group and intra-group interconnects that communicatively couple the computing nodes of the first group and the second group along the first dimension, and syncing data across the first dimension comprises transferring, in a unit time, sub-data from a computing node along the first dimension to another computing node in a unit time via a connection on the first set of ring connections;

syncing data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the second dimension to another computing node in a unit time via a connection on the second set of ring connections; and broadcasting synced data across the first dimension or the second dimension of computing nodes using the first set of ring connections or the second set of ring connections.

20. The non-transitory computer readable medium of clause 19, wherein the data to be synced comprises a plurality of sub-data, and each computing node comprises a different version of each sub-data.

21. The non-transitory computer readable medium of clause 20, wherein the method further comprises:

in a clock cycle, receiving a version of sub-data by each computing node in a row, wherein the version of the sub-data is transferred from another computing node in the row via the connection on the first set of ring connections; and continuing data transferring until each computing node along the first dimension receives all versions of a sub-data from all computing nodes in the row.

22. The non-transitory computer readable medium of clause 21, wherein the method further comprises:

in a clock cycle, receiving a version of sub-data by each computing node in a column, wherein the version of the sub-data is transferred from another computing node in the column via the connection on the second set of ring connections; and continuing data transferring until each computing node along the second dimension receives all versions of a sub-data from all computing nodes.

23. The non-transitory computer readable medium of clause 21, wherein the method further comprises:

in a clock cycle, receiving sub-data by each computing node across the first dimension or the second dimension, wherein the sub-data transferred from another computing node across the first dimension or the second dimension via the connection on the first set of ring connections or the connection on the second ring connections; and continuing data transferring until all computing nodes along the first dimension or the second dimension receives sub-data from all computing nodes.

24. The non-transitory computer readable medium of clause 19, wherein the set of intra-group interconnects and the set of inter-group interconnects comprise inter-chip interconnects.

25. The non-transitory computer readable medium of clause 19, wherein the computing nodes are processors.

26. The non-transitory computer readable medium of clause 25, wherein the computing nodes are artificial intelligence ("AI") training processors, AI training chips, neural processing units ("NPU"), or graphic processing units ("GPU").

27. The non-transitory computer readable medium of clause 26, wherein the computing task is an AI computing task involving an allreduce algorithm.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of stages shown in figures are only for illustrative purposes and are not intended to be limited to any particular sequence of stages. As such, those skilled in the art can appreciate that these stages can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group and a computing node A of a third group neighboring the first group, a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the method comprising:

syncing data across a first dimension of computing nodes of the first group and the second group using a first set of ring connections, wherein the first set of ring connections are formed using inter-group and intra-group interconnects that communicatively couple the computing nodes of the first group and the second group along the first dimension, and the syncing data across the first dimension comprises transferring, in a unit time, sub-data from a computing node along the first dimension to another computing node in a unit time via a connection on the first set of ring connections;

syncing data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the second dimension to another computing node in a unit time via a connection on the second set of ring connections; and broadcasting synced data across the first dimension or the second dimension of computing nodes using the first set of ring connections or the second set of ring connections.

2. The method of claim 1, wherein the data to be synced comprises a plurality of sub-data, and each computing node comprises a different version of each sub-data.

3. The method of claim 2, wherein:
syncing data across a first dimension of computing nodes using a first set of ring connections further comprises:
in a clock cycle, receiving a version of sub-data by each computing node in a row, wherein the version of the sub-data is transferred from another computing node in the row via the connection on the first set of ring connections; and
continuing data transferring until each computing node along the first dimension receives all versions of a sub-data from all computing nodes in the row.

4. The method of claim 3, wherein:
syncing data across a second dimension of computing nodes using a second set of ring connections further comprises:
in a clock cycle, receiving a version of sub-data by each computing node in a column, wherein the version of the sub-data is transferred from another computing node in the column via the connection on the second set of ring connections; and
continuing data transferring until each computing node along the second dimension receives all versions of a sub-data from all computing nodes.

5. The method claim 3, wherein broadcasting synced data across the first dimension or the second dimension of computing nodes using the first set of ring connections or the second set of ring connections further comprises:
in a clock cycle, receiving sub-data by each computing node across the first dimension or the second dimension, wherein the sub-data transferred from another computing node across the first dimension or the second dimension via the connection on the first set of ring connections or the connection on the second set of ring connections; and
continuing data transferring until all computing nodes along the first dimension or the second dimension receive sub-data from all computing nodes.

6. The method of claim 1, wherein the set of intra-group interconnects and the set of inter-group interconnects comprise inter-chip interconnects.

7. The method of claim 1, wherein the computing nodes are artificial intelligence ("AI") training processors, AI training chips, neural processing units ("NPU"), or graphic processing units ("GPU").

8. The method of claim 7, wherein the computing task is an AI computing task involving an allreduce algorithm.

9. A system for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group, and a computing node A of a third group neighboring the first group a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the system comprising:
a memory storing a set of instructions; and
one or more processors configured to execute the set of instructions to cause the system to:
sync data across a first dimension of computing nodes of the first group and the second group using a first set of ring connections, wherein the first set of ring connections are formed using inter-group and intra-group interconnects that communicatively couple the computing nodes of the first group and the second group along the first dimension, and the syncing data across the first dimension comprises transferring, in a unit time, sub-data from a computing node along the first dimension to another computing node in a unit time via a connection on the first set of ring connections;
sync data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the second dimension to another computing node in a unit time via a connection on the second set of ring connections; and
broadcast synced data across the first dimension or the second dimension of computing nodes using the first set of ring connections or the second set of ring connections.

10. The system of claim 9, wherein the data to be synced comprises a plurality of sub-data, and each computing node comprises a different version of each sub-data.

11. The system of claim 10, wherein the one or more processors are further configured to execute the set of instructions to cause the system to:
in a clock cycle, receive a version of sub-data by each computing node in a row, wherein the version of the sub-data is transferred from another computing node in the row via the connection on the first set of ring connections; and
continue data transferring until each computing node along the first dimension receives all versions of a sub-data from all computing nodes in the row.

12. The system of claim 11, wherein the one or more processors are further configured to execute the set of instructions to cause the system to:
in a clock cycle, receive a version of sub-data by each computing node in a column, wherein the version of the sub-data is transferred from another computing node in the column via the connection on the second set of ring connections; and
continue data transferring until each computing node along the second dimension receives all versions of a sub-data from all computing nodes.

13. The system of claim 10, wherein the one or more processors are further configured to execute the set of instructions to cause the system to:
in a clock cycle, receive sub-data by each computing node across the first dimension or the second dimension, wherein the sub-data transferred from another computing node across the first dimension or the second dimension via the connection on the first set of ring connections or the connection on the second set of ring connections; and continue data transferring until all computing nodes along the first dimension or the second dimension receive sub-data from all computing nodes.

14. The system of claim 9, wherein the set of intra-group interconnects and the set of inter-group interconnects comprise inter-chip interconnects.

15. The system of claim 9, wherein the computing nodes are artificial intelligence ("AI") training processors, AI training chips, neural processing units ("NPU"), or graphic processing units ("GPU").

16. The system of claim 15, wherein the computing task is an AI computing task involving an allreduce algorithm.

17. A non-transitory computer readable medium that stores a set of instructions that is executable by one or more processors of an apparatus to cause the apparatus to initiate a method for syncing data of a computing task across a plurality of groups of computing nodes, each group comprising a set of computing nodes A-D, a set of intra-group interconnects that communicatively couple computing node A with computing nodes B and C and computing node D with computing nodes B and C, and a set of inter-group interconnects that communicatively couple a computing node A of a first group of the plurality of groups with a computing node A of a second group neighboring the first group and a computing node A of a third group neighboring the first group, a computing node B of the first group with a computing node B of the second group and a computing node B of the third group, a computing node C of the first group with a computing node C of the second group and a computing node C of the third group, and a computing node D of the first group with a computing node D of the second group and a computing node D of the third group, wherein the second group and the third group are aligned with the first group in different dimensions, the method comprising:

syncing data across a first dimension of computing nodes of the first group and the second group using a first set of ring connections, wherein the first set of ring connections are formed using inter-group and intra-group interconnects that communicatively couple the computing nodes of the first group and the second group along the first dimension, and the syncing data across the first dimension comprises transferring, in a unit time, sub-data from a computing node along the first dimension to another computing node in a unit time via a connection on a first set of ring connections;

syncing data across a second dimension of computing nodes of the first group and the third group using a second set of ring connections, wherein the second set of ring connections are formed using inter-group and intra-group interconnects that communicatively couple the computing nodes of the first group and the third group along the second dimension, and syncing data across the second dimension comprises transferring, in a unit time, sub-data from a computing node along the second dimension to another computing node in a unit time via a connection on the second set of ring connections; and broadcasting synced data across the first dimension or the second dimension of computing nodes using the first set of ring connections or the second set of ring connections.

18. The non-transitory computer readable medium of claim 17, wherein the data to be synced comprises a plurality of sub-data, and each computing node comprises a different version of each sub-data.

19. The non-transitory computer readable medium of claim 18, wherein the method further comprises:

in a clock cycle, receiving a version of sub-data by each computing node in a row, wherein the version of the sub-data is transferred from another computing node in the row via the connection on the first set of ring connections; and continuing data transferring until each computing node along the first dimension receives all versions of a sub-data from all computing nodes in the row.

20. The non-transitory computer readable medium of claim 19, wherein the method further comprises:

in a clock cycle, receiving a version of sub-data by each computing node in a column, wherein the version of the sub-data is transferred from another computing node in the column via the connection on the second set of ring connections; and continuing data transferring until each computing node along the second dimension receives all versions of a sub-data from all computing nodes.

21. The non-transitory computer readable medium of claim 19, wherein the method further comprises:

in a clock cycle, receiving sub-data by each computing node across the first dimension or the second dimension, wherein the sub-data transferred from another computing node across the first dimension or the second dimension via the connection on the first set of ring connections or the connection on the second set of ring connections; and continuing data transferring until all computing nodes along the first dimension or the second dimension receives sub-data from all computing nodes.

22. The non-transitory computer readable medium of claim 17, wherein the set of intra-group interconnects and the set of inter-group interconnects comprise inter-chip interconnects.

23. The non-transitory computer readable medium of claim 17, wherein the computing nodes are artificial intelligence ("AI") training processors, AI training chips, neural processing units ("NPU"), or graphic processing units ("GPU").

24. The non-transitory computer readable medium of claim 23, wherein the computing task is an AI computing task involving an allreduce algorithm.

* * * * *